United States Patent
Takemoto et al.

(10) Patent No.: US 8,264,113 B2
(45) Date of Patent: Sep. 11, 2012

(54) BRUSHLESS MOTOR

(75) Inventors: Yoshiaki Takemoto, Toyohashi (JP);
Seiya Yokoyama, Toyohashi (JP); Yoji Yamada, Hamamatsu (JP); Shigemasa Kato, Toyohashi (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

(21) Appl. No.: 13/409,194

(22) Filed: Mar. 1, 2012

(65) Prior Publication Data
US 2012/0175987 A1 Jul. 12, 2012

Related U.S. Application Data

(62) Division of application No. 12/638,567, filed on Dec. 15, 2009.

(30) Foreign Application Priority Data

| Dec. 17, 2008 | (JP) | 2008-321331 |
| Apr. 6, 2009 | (JP) | 2009-092292 |
| Apr. 15, 2009 | (JP) | 2009-099335 |
| Jun. 9, 2009 | (JP) | 2009-138654 |
| Jun. 10, 2009 | (JP) | 2009-139351 |

(51) Int. Cl.
*H02K 21/12* (2006.01)

(52) U.S. Cl. ............................................. 310/156.53

(58) Field of Classification Search . 310/156.01–156.84
See application file for complete search history.

(56) References Cited

U.S. PATENT DOCUMENTS

| 5,508,576 A * | 4/1996 | Nagate et al. ............ 310/156.54 |
| 5,650,680 A * | 7/1997 | Chula ....................... 310/156.53 |
| 6,917,133 B2 | 7/2005 | Koharagi et al. |
| 7,768,171 B2 * | 8/2010 | Taniguchi et al. ........ 310/156.53 |
| 2005/0023920 A1* | 2/2005 | Tajima et al. ............. 310/156.53 |
| 2005/0077801 A1 | 4/2005 | Han et al. |
| 2007/0159021 A1* | 7/2007 | Horst ........................ 310/156.53 |
| 2008/0018190 A1 | 1/2008 | Takahata et al. |

FOREIGN PATENT DOCUMENTS

| JP | 10-150755 | 6/1998 |
| JP | 2004-201406 | 7/2004 |
| JP | 2008-113531 | 5/2008 |
| JP | 2008-141803 | 6/2008 |

* cited by examiner

*Primary Examiner* — Nguyen N Hanh
(74) *Attorney, Agent, or Firm* — Duane Morris LLP; J. Rodman Steele, Jr.; Gregory M. Lefkowitz

(57) ABSTRACT

A brushless motor including a stator having teeth and a rotor having magnetic pole portions is disclosed. The magnetic pole portions are arranged to have the same polarities as each other. The rotor includes gaps that function as magnetic resistance at circumferential ends of each of the magnetic pole portions so that an iron core portion is formed between the circumferentially adjacent magnetic pole portions. Magnetic flux of the magnetic pole portions passes through the iron core portion along the radial direction. The gaps include a first gap located on the leading end of the magnetic pole portion in the rotation direction of the rotor and a second gap located on the trailing end of the magnetic pole portion in the rotation direction of the rotor. The circumferential width of the first gap is set to be greater than the circumferential width of the second gap.

12 Claims, 27 Drawing Sheets

BRUSHLESS MOTOR

CROSS-REFERENCE TO RELATED APPLICATIONS

This application is a divisional of U.S. patent application Ser. No. 12/638,567 filed Dec. 15, 2009, which claims priority to Japanese Patent Application 2008-321331, filed Dec. 17, 2008, Japanese Patent Application 2009-092292, filed Apr. 6, 2009, Japanese Patent Application 2009-099335, filed Apr. 15, 2009, Japanese Patent Application 2009-138654, filed Jun. 9, 2009, and Japanese Patent Application 2009-139351, filed Jun. 10, 2009, the entire contents of which are incorporated herein by reference.

BACKGROUND OF THE INVENTION

The present invention relates to a brushless motor including a rotor having magnetic pole portions arranged such that all the polarities are the same, and an iron core portion, which is located between circumferentially adjacent magnetic pole portions and permits the magnetic flux of the magnetic pole portions to pass in the radial direction.

In a conventional brushless motor including a rotor having magnetic pole portions formed by permanent magnets, it has been proposed to increase motor torque by increasing the number of the magnetic poles, or by forming the magnetic pole portions with strong permanent magnets.

However, strong permanent magnets such as neodymium magnets are expensive, and there are limitations in reducing the thickness of the magnets. Thus, the manufacturing costs are increased when manufacturing a multipole motor (for example, an 8-pole 12-slot motor) using the strong permanent magnets as disclosed in Japanese Laid-Open Patent Publication No. 2008-113531.

Japanese Laid-Open Patent Publication No. 10-150755 proposes a brushless motor including a consequent pole rotor in which the magnetic pole portions formed in the rotor are arranged such that the polarities of all the magnetic pole portions are the same pole, and an iron core portion is provided between circumferentially adjacent magnetic pole portions to permit the magnetic flux from the magnetic pole portions to pass along the radial direction of the rotor.

More specifically, four magnetic pole portions 33 are provided on a rotor 32 of a brushless motor 31 at equal intervals in the circumferential direction as shown in FIG. 42. The polarities of all the magnetic pole portions 33 are the same, and all the magnetic pole portions 33 are accommodated in magnet accommodating holes H such that the radially outer sides are south poles in the rotor 32 shown in FIG. 42. The magnetic pole portions 33 are formed by plate-like permanent magnets 30. Also, gaps 34 are provided on both ends of each magnetic pole portion 33 in the circumferential direction. The gaps 34 function as magnetic resistance. An iron core portion 36 is formed between circumferentially adjacent magnetic pole portions 33. The iron core portion 36 is magnetically divided from the magnetic pole portions 33 in the circumferential direction.

As shown in FIG. 43, the magnetic flux of the pole portions 33 flows into the corresponding iron core portion 36 via the inner part of the rotor 32 bypassing the gaps 34 formed on the circumferential ends of the magnetic pole portions 33. As the magnetic flux passes through each iron core portion 36 in the radial direction, a pseudo magnetic pole having different polarity from the magnetic pole portions 33 that are circumferentially adjacent to the iron core portion 36 is formed in the iron core portion 36. The pseudo magnetic poles shown in FIG. 42 are parts shown by areas α, and radially outer sides are north poles.

That is, such a consequent pole rotor 32 reduces the number of the permanent magnets 30 by half as compared to a rotor 42 of a normal brushless motor 41 in which the permanent magnets 30 are arranged such that the polarities of circumferentially adjacent magnetic poles (magnetic pole portions 43) are different from each other as shown in FIG. 44. Thus, the consequent pole rotor 32 achieves the same advantages as a multipole rotor without increasing the manufacturing costs.

However, since a magnetic field formed in the stator, which is provided radially outward of the rotor, acts on the rotor during activation of the motor, the magnetic flux that passes in the radial direction is increased at some part and decreased at other part in the iron core portions forming the pseudo magnetic poles as described above. Thus, the magnetic center position in each iron core portion is shifted, and as a result, the magnetic balance of the rotor might fluctuate.

That is, normally, when one of the magnetic poles provided on the rotor is at a position that faces two teeth in the brushless motor, a magnetic field having magnetic force that attracts the magnetic pole is formed in the leading tooth among the two teeth, and a magnetic field having magnetic force that repels the magnetic pole is formed in the trailing tooth.

Here, in the normal brushless motor 41 having the rotor 42 as shown in FIG. 45, the magnetic flux formed by the permanent magnets 30 is not partially reduced or increased by the magnetic field of a stator 35. Thus, the magnetic balance of the rotor 42 does not fluctuate since the magnetic center position of the magnetic poles in the state of FIG. 45, that is, the position where a straight line N0 passes in FIG. 45 is not significantly shifted.

However, in the case with the brushless motor 31 including the consequent pole rotor 32 as shown in FIG. 46, when one of the iron core portions 36 forming the pseudo magnetic pole is at the position to face two teeth 37 (37a, 37b), the magnetic center position is significantly shifted forward in the rotation direction of the rotor 32, that is, to the position where a straight line N1 passes in FIG. 46.

That is, while the magnetic flux easily flows by the magnetic attractive force formed by the tooth 37a and a coil 38 at part of the iron core portion 36 that faces the leading tooth 37a, the flow of the magnetic flux is hindered by the magnetic repulsive force formed by the tooth 37b and the coil 38 at part of the iron core portion 36 that faces the trailing tooth 37b.

That is, while the magnetic field of the stator 35 draws out the magnetic flux that passes through the iron core portion 36 in the radial direction at the leading section of the iron core portion 36, the magnetic field of the stator 35 hinders the magnetic flux from passing in the radial direction at the trailing section of the iron core portion 36. As a result, the magnetic center position in the iron core portion 36 is shifted forward of the rotation. This causes fluctuation of the magnetic balance of the rotor 32, which reduces the output of the motor, or causes noise and vibration. In this respect, there is still room for improvement.

Also, when inserting the permanent magnets 30 in the magnet accommodating holes H in the rotor 32 of the brushless motor 31 as shown in FIG. 46, the magnet accommodating portions H and the permanent magnets 30 are formed taking into consideration the dimensional tolerance of the magnet accommodating holes H and the dimensional tolerance of the permanent magnets 30 to facilitate the insertion. Thus, a gap is easily generated between the permanent magnets 30 and the magnet accommodating holes H. In particular, the gap in the radial direction reduces permeance (reciprocal of the magnetic resistance), and the magnetic flux generated in the permanent magnet is not effectively used. This reduces the output performance.

SUMMARY OF THE INVENTION

A first objective of the present invention is to provide a brushless motor that reduces fluctuation of magnetic balance during rotation of a rotor, and has high performance.

A second objective of the present invention is to provide a brushless motor that improves output performance.

To achieve the above objectives, and in accordance with a first aspect of the present invention, a brushless motor is provided. The brushless motor includes a stator and a rotor. The stator includes teeth around which coils are wound. The rotor is rotatably arranged radially inward of the stator. The rotor includes magnetic pole portions that face the teeth. The magnetic pole portions are formed by permanent magnets arranged at equal angular intervals in the circumferential direction. The magnetic pole portions have the same polarities as each other. The rotor includes gaps that function as magnetic resistance at circumferential ends of each of the magnetic pole portions so that an iron core portion is formed between circumferentially adjacent magnetic pole portions. Magnetic flux of the magnetic pole portions passes through the iron core portion along the radial direction. The rotor is structured such that the rotation direction is defined to be one direction. The gaps formed on the circumferential ends of each of the magnetic pole portions include a first gap located on the leading end of the magnetic pole portion in the rotation direction of the rotor and a second gap located on the trailing end of the magnetic pole portion in the rotation direction of the rotor. The circumferential width of the first gap is set to be greater than the circumferential width of the second gap.

To achieve the above objectives and in accordance with a second aspect of the present, a brushless motor is provided. The brushless motor includes a stator and a rotor. The stator includes teeth around which coils are wound. The rotor is rotatable with respect to the teeth and includes magnetic pole portions that face the teeth. The rotor includes magnet accommodating portions arranged at equal angular intervals along the circumferential direction of the rotor. Permanent magnets forming the magnetic pole portions are accommodated in the magnet accommodating portions. The permanent magnets face the teeth and have magnetic pole surfaces of the same polarities. The rotor includes gaps that function as magnetic resistance at circumferential ends of each of the magnetic pole portions so that an iron core portion is formed between circumferentially adjacent magnetic pole portions. Magnetic flux of the magnetic pole portions passes through the iron core portion along the radial direction. A magnetic member is arranged in each magnet accommodating portion to fill the gap between the magnetic pole surface of the associated permanent magnet and the inner surface of the magnet accommodating portion facing the magnetic pole surface.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

A brushless motor (IPM motor) 1 including an embedded permanent magnet rotor 6 according to a first embodiment of the present invention will now be described with reference to FIGS. 1 to 9.

Figure 1:
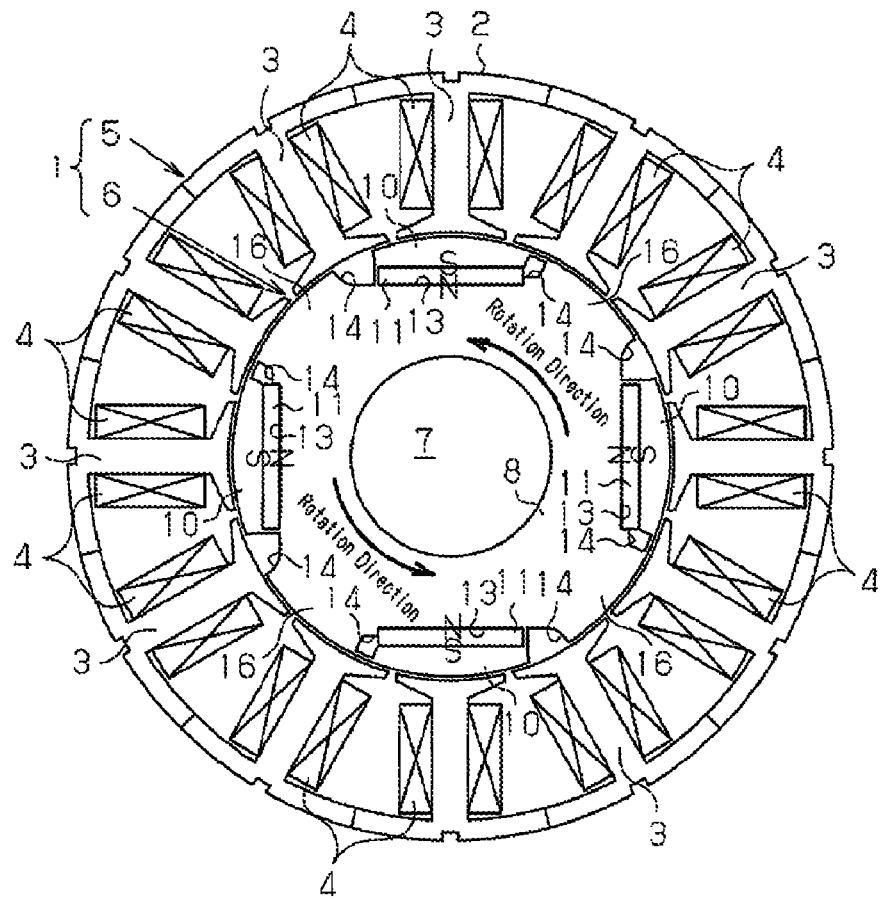
FIG. 1 is a schematic diagram illustrating a brushless motor according to a first embodiment of the present invention.

As shown in FIG. 1, the brushless motor 1 of the present embodiment includes a stator 5 and the rotor 6. The stator 5 includes an annular portion 2, teeth 3, which extend radially inward from the annular portion 2, and coils 4, which are wound around the teeth 3.

In the present embodiment, the stator 5 includes twelve teeth 3, and the stator 5 therefore has twelve slots. Three-phase alternating current is supplied to the coils 4.

The rotor 6 includes a rotary shaft 7 and a columnar rotor core 8, which is secured to the rotary shaft 7. The rotary shaft 7 is supported by non-illustrated bearings. The rotor 6 is arranged radially inward of the stator 5 while being surrounded by the teeth 3, and is freely rotatable. Magnetic pole portions 10, which face the teeth 3 surrounding the rotor 6, are provided at the peripheral portion of the rotor 6.

Figure 2:
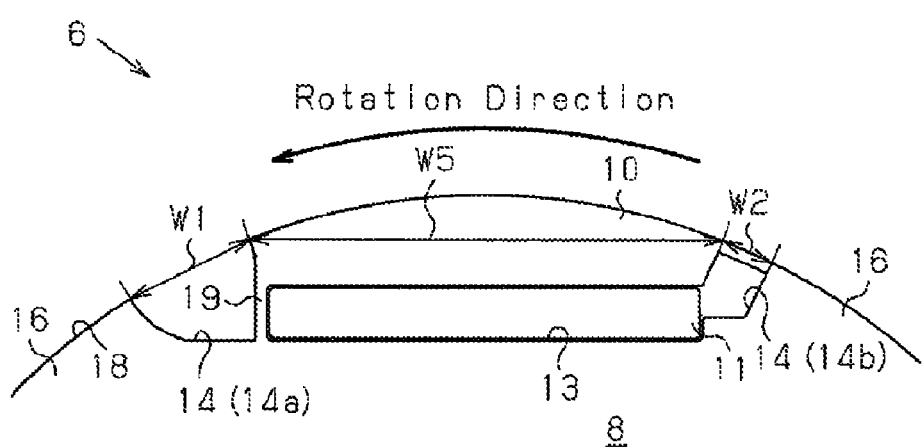
FIG. 2 is an enlarged view illustrating the pole portion and its surrounding of the rotor of FIG. 1.
Figure 3:
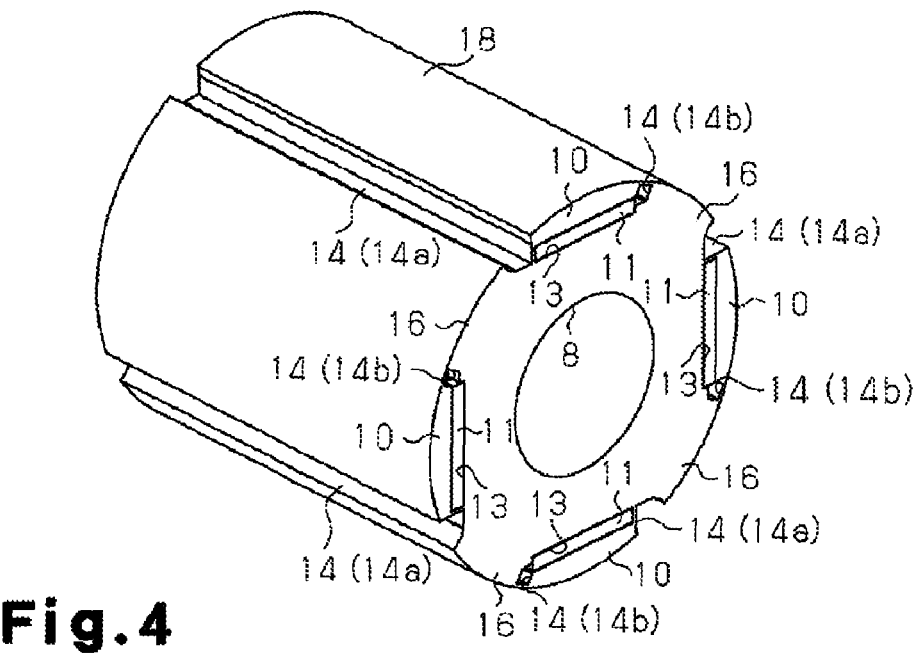
FIG. 3 is a perspective view illustrating the rotor core in which the permanent magnets are embedded.

More specifically, as shown in FIGS. 1 to 3, the magnetic pole portions 10 are formed by plate-like permanent magnets 11 embedded in the peripheral portion of the rotor core 8. That is, the brushless motor 1 of the present embodiment is an IPM motor, which includes an embedded permanent magnet rotor. Typically, magnet accommodating portions, which are magnet accommodating holes 13 in this embodiment, are provided at equal angular intervals in the circumferential direction (in the present embodiment, intervals of 90°) in the vicinity of the peripheral portion of the rotor core 8. The magnet accommodating holes 13 extend through the axial direction of the rotor core 8. The permanent magnets 11 are accommodated in and secured to the magnet accommodating holes 13 in a manner in which the permanent magnets 11 are perpendicular to the radial direction of the rotor core 8.

All the permanent magnets 11 are arranged in the magnet accommodating holes 13 such that the radially outer surfaces have the same polarities. In the present embodiment, all the permanent magnets 11 are arranged in the magnet accommodating holes 13 such that the radially outer surfaces are south poles. That is, in the rotor 6 of the present embodiment, four magnetic pole portions 10 having the same polarities are arranged along the circumferential direction of the rotor 6 at equal angular intervals. Also, two gaps 14 (14*a*, 14*b*) are formed at both circumferential ends of each pole portion 10. Since the gaps 14 function as magnetic resistance, an iron core portion 16, which is magnetically divided from the magnetic pole portions 10 in the circumferential direction, is formed between the circumferentially adjacent magnetic pole portions 10.

Figure 43:
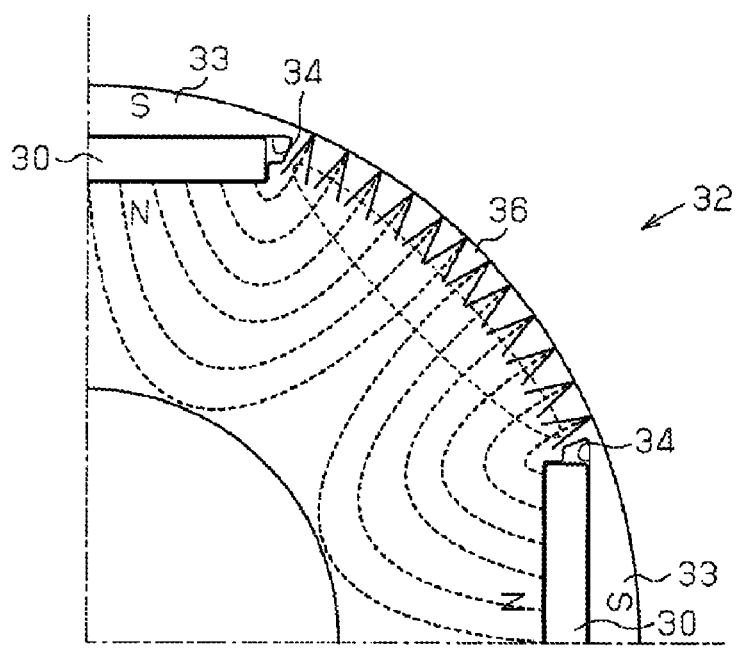
FIG. 43 is a diagram for explaining formation of pseudo magnetic poles at the iron core portions of FIG. 42.

That is, the magnetic flux of each pole portion 10 flows into the corresponding iron core portion 16 via the inner part of the rotor core 8 bypassing the gaps 14 formed on the circumferential ends of the magnetic pole portions 10. When the magnetic flux passes radially outward through the iron core portion 16, a pseudo magnetic pole that has a different polarity from the magnetic pole portions 10 that are circumferentially adjacent to the iron core portion 16 is formed in the iron core portion 16. Refer to FIG. 43 for the mechanism of forming the pseudo magnetic poles in the iron core portions 16.

That is, the rotor 6 of the present embodiment is a consequent pole rotor. In the comparison of the brushless motor 1 of the first embodiment and a normal brushless motor (see FIG. 44) in which all the magnetic poles of the rotor are formed by permanent magnets, the brushless motor 1 has an advantage of multipolarization while reducing the number of the permanent magnets by half. That is, the brushless motor 1 has a structure that permits reduction in the size and increase in the output as compared to the normal brushless motor shown in FIG. 43.

The brushless motor 1 of the present embodiment is configured to be optimal for use in which the rotation direction of the rotor 6 is restricted to one direction. That is, in the present embodiment, the counterclockwise direction in FIGS. 1 and 2 is defined as the rotation direction of the rotor 6. Hereinafter, the gap 14 located on the leading end of each pole portion 10 in the rotation direction of the rotor 6 is referred to as a first gap 14a, and the gap 14 formed on the trailing end of the pole portion 10 in the rotation direction of the rotor 6 is referred to as a second gap 14b. As shown in FIG. 2, a circumferential width W1 of the first gap 14a is set to be greater than a circumferential width W2 of the second gap 14b.

Figure 4:
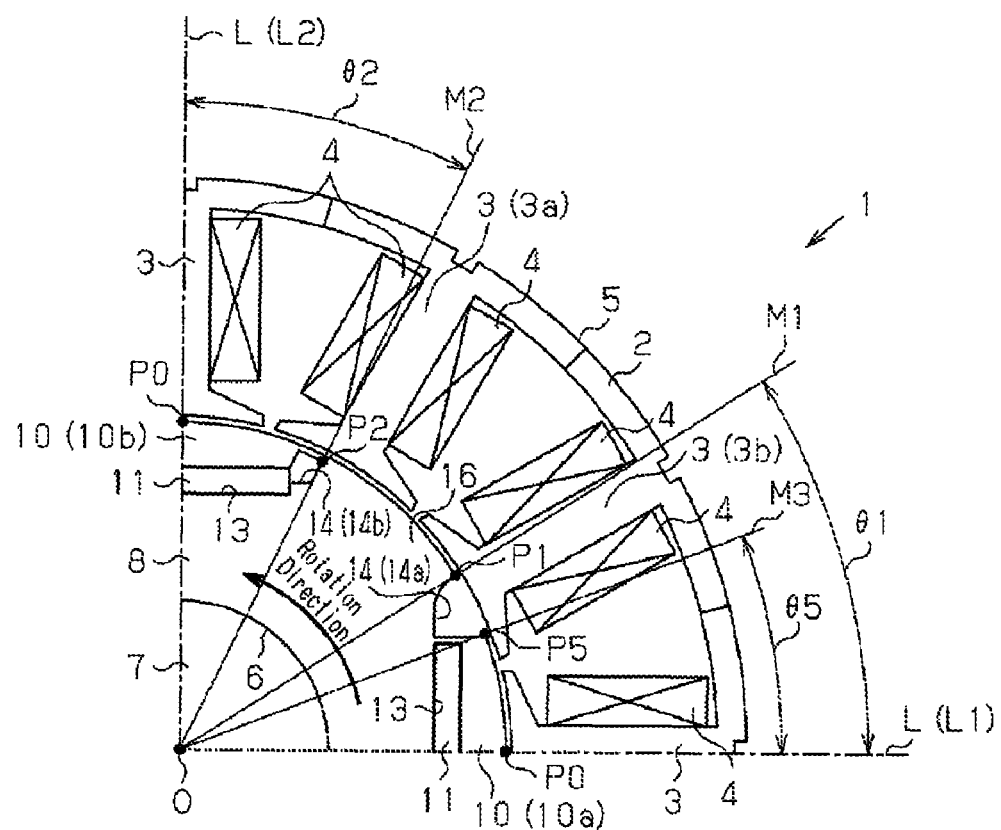
FIG. 4 is an explanatory diagram showing the relationship between the pole portions formed in the rotor of FIG. 1 and gaps formed on both ends of each pole portion and the iron core portion.

As shown in FIG. 4, the angle defined by a straight line L (L1) that passes through a center O of the rotor 6 and a circumferential center position P0 of the magnetic pole portion 10 (10a), and a straight line M1 that passes through the center O of the rotor 6 and an end P1 located on the leading end of the first gap 14a is referred to as a first angle of nip $\theta 1$. The angle defined by a straight line L (L2) that passes through the center O of the rotor 6 and the circumferential center position P0 of the pole portion 10 (10b), and a straight line M2 that passes through the center O of the rotor 6 and an end P2 located on the trailing end of the second gap 14b is referred to as a second angle of nip $\theta 2$. The angle defined by the straight line L (L1) and a straight line M5 that passes through a circumferential end portion P5 of the pole portion 10 (10a) is referred to as a fifth angle of nip $\theta 5$. That is, the angle twice the fifth angle of nip $\theta 5$ corresponds to a circumferential width W5 of the pole portion 10 (10a). In the rotor 6 of the present embodiment, the first angle of nip $\theta 1$ is set to be greater than the second angle of nip $\theta 2$.

That is, the fifth angles of nip $\theta 5$ are all equal since the plate-like permanent magnets 11, which form the magnetic pole portions 10, are arranged at equal angular intervals in the circumferential direction of the rotor core 8. In other words, all the circumferential widths W5 of the magnetic pole portions 10 are equal. Thus, setting the first angle of nip $\theta 1$ to be greater than the second angle of nip $\theta 2$ as described above permits the circumferential width W1 of the first gap 14a to be greater than the circumferential width W2 of the second gap 14b (see FIG. 2). Thus, the present embodiment reduces the above-described shifting of the magnetic center position in the iron core portions 16 during rotation of the rotor 6, and the associated fluctuation of the magnetic balance.

Figure 46:
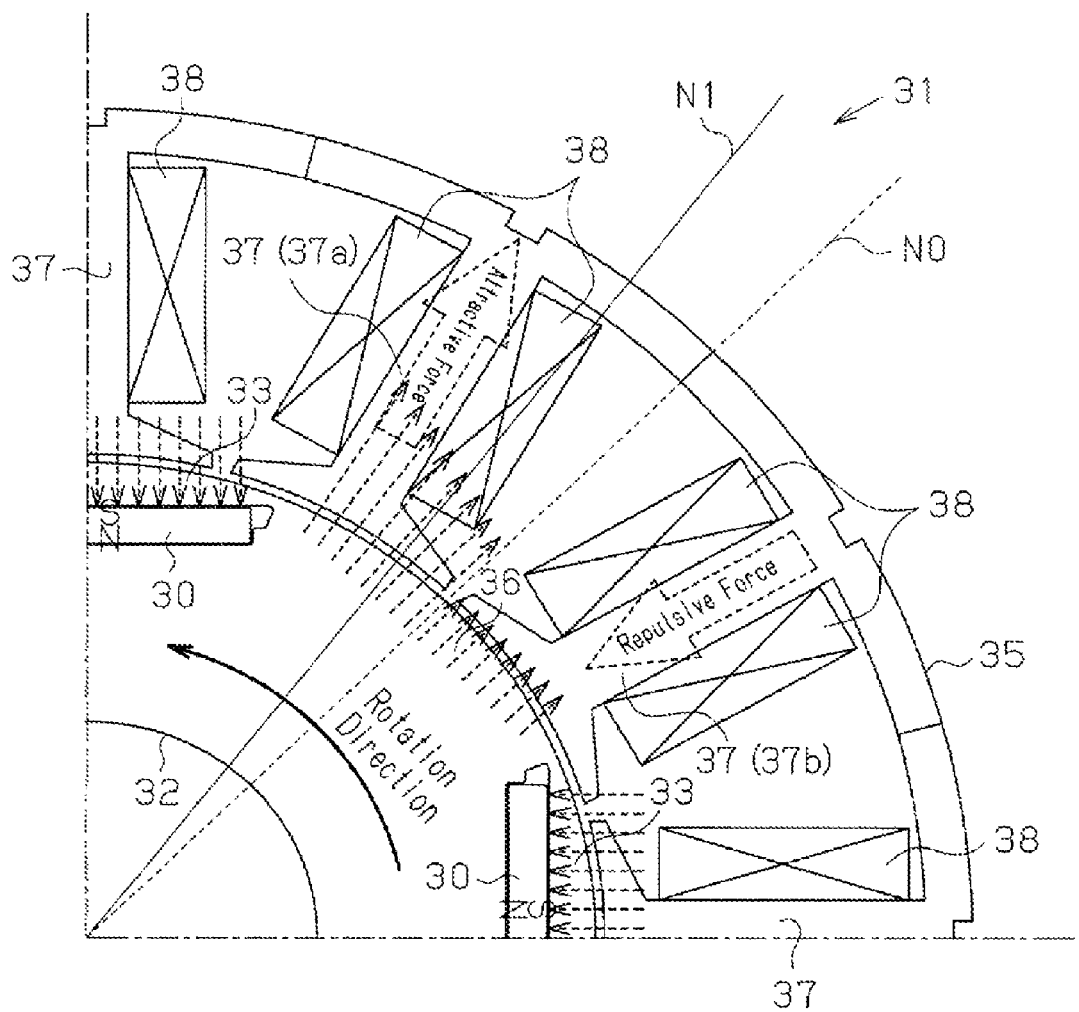
FIG. 46 is a diagram illustrating distribution of magnetic flux between the stator and the rotor of the brushless motor of FIG. 42.

That is, when each iron core portion is located to face two teeth in the conventional consequent pole rotor as shown in FIG. 46, the magnetic flux flow easier at the leading part of the iron core portion where magnetic attractive force acts between the iron core portion and the facing tooth. In contrast, the flow of the magnetic flux is hindered at the trailing part of the iron core portion, where magnetic repulsive force acts between the iron core portion and the facing tooth. As a result, the magnetic balance fluctuates during rotation of the rotor.

Figure 5:
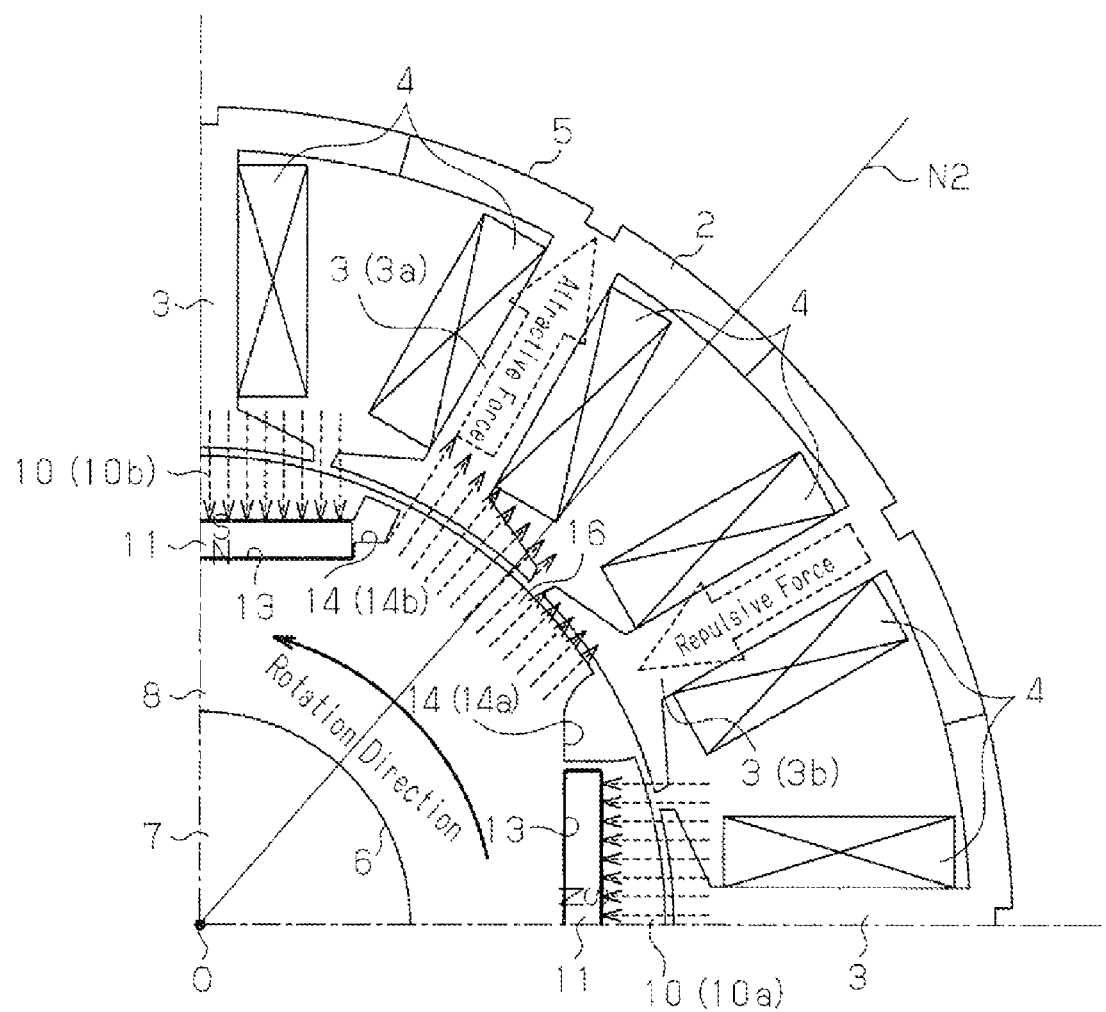
FIG. 5 is a diagram explaining operation of the brushless motor of FIG. 1.

However, in the brushless motor 1 of the present embodiment, the circumferential width W1 of the first gap 14a is greater than the circumferential width W2 of the second gap 14b. Thus, as shown in FIG. 5, when the iron core portion 16 formed between the second gap 14b of one pole portion 10 and the first gap 14a of the pole portion 10 that is adjacent to the above-mentioned pole portion 10 in the rear direction of rotation faces two teeth 3 (3a, 3b), the proportion of the part of the iron core portion 16 facing the trailing tooth 3b is small.

This reduces the amount of magnetic flux that is inhibited from flowing from the iron core portion 16 to the tooth 3b by the magnetic repulsive force generated between the tooth 3b and the iron core portion 16 facing the tooth 3b. This also reduces the amount of the magnetic flux that flows from the iron core portion 16 to the tooth 3a by being drawn out by the magnetic attractive force generated between the tooth 3a and the iron core portion 16 facing the tooth 3a.

The total amount of the magnetic flux that flows from the pole portions 10 separated by the gaps 14 (14a, 14b) to the associated iron core portion 16 via the inner part of the rotor core 8 is substantially constant. Thus, the amount of the magnetic flux that is suppressed by the magnetic repulsive force generated between the tooth 3b and the iron core portion 16 facing the tooth 3b is equal to the magnetic flux that is drawn out by the magnetic attractive force generated between the tooth 3a and the iron core portion 16 facing the tooth 3a. Thus, as described above, by reducing the amount of magnetic flux suppressed by the magnetic repulsive force generated between the tooth 3b and the iron core portion 16 facing the tooth 3b, the magnetic center position of the iron core portion 16 (in FIG. 5, the circumferential position through which a straight line N2 passes) is prevented from being shifted forward in the rotation direction of the rotor 6 during rotation of the rotor 6. In the present embodiment, fluctuation of the magnetic balance during rotation of the rotor 6 is thus reduced, and the output of the brushless motor 1 is further increased.

Also, in the present embodiment, the first gaps 14a are formed to open in a circumferential surface 18 of the rotor 6 (rotor core 8) as shown in FIGS. 1 to 3. This increases the magnetic resistance of the first gaps 14a, and thus further reduces the influence of the magnetic repulsive force between the tooth 3b and the iron core portion 16 facing the tooth 3b.

In the present embodiment, a bridge portion 19, which defines the first gap 14a and the magnet accommodating hole 13, is formed between the first gap 14a and the magnet accommodating hole 13 as shown in FIG. 2. Thus, the strength of the rotor 6 is prevented from being reduced by opening the first gaps 14a in the circumferential surface 18 of the rotor core 8.

The brushless motor 1 of the present embodiment includes four magnetic pole portions 10, four iron core portions 16, and twelve teeth 3 so that the structure is substantially the same as an 8-pole 12-slot brushless motor. That is, when one iron core portion 16 faces two teeth 3, all the other iron core portions 16 respectively face two teeth 3 (see FIG. 1) since the number of the slots formed between adjacent teeth 3 is a multiple of the number of the iron core portions. Thus, the fluctuation of magnetic balance during rotation of the rotor 6 is further efficiently reduced as described above.

The optimal design of the angle of nip $\theta 5$ that defines the circumferential width W5 of the magnetic pole portions 10 and the angles of nip $\theta 1$, $\theta 2$ that specify the circumferential widths W1, W2 of the first and second gaps formed on the circumferential ends of the magnetic pole portions 10 will now be described.

Figure 6:
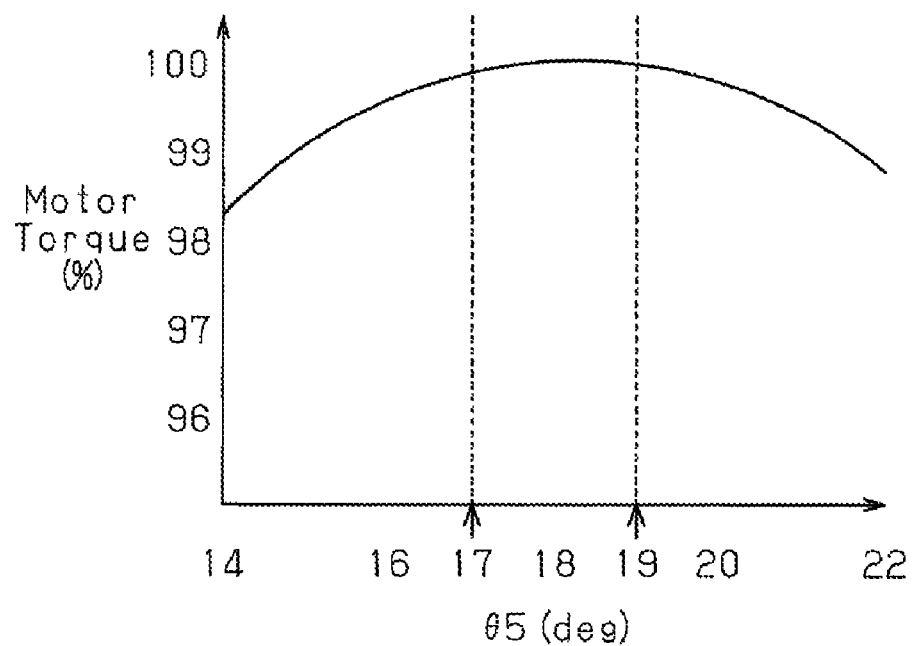
FIG. 6 is a graph showing the relationship between a fifth angle of nip defining the circumferential width of the pole portions and the motor torque.

FIG. 6 is a graph showing the relationship between the fifth angle of nip $\theta 5$ (see FIGS. 2 and 4) and the torque of the motor 1. Taking into consideration that the brushless motor 1 of the present embodiment has substantially the same structure as the 8-pole 12 slot brushless motor, the upper limit of the fifth angle of nip $\theta 5$ is assumed to be approximately 22°. As shown in FIG. 6, the torque of the motor 1 reaches the maximum value (100%) when the fifth angle of nip $\theta 5$ is approximately 18°, and is ensured to greater than or equal to 99.5% of the maximum value when the angle of nip θ5 is in the range of 17° to 19°. Thus, the angle of nip θ3 is preferably set in the range of 17° to 19°.

Figure 7:
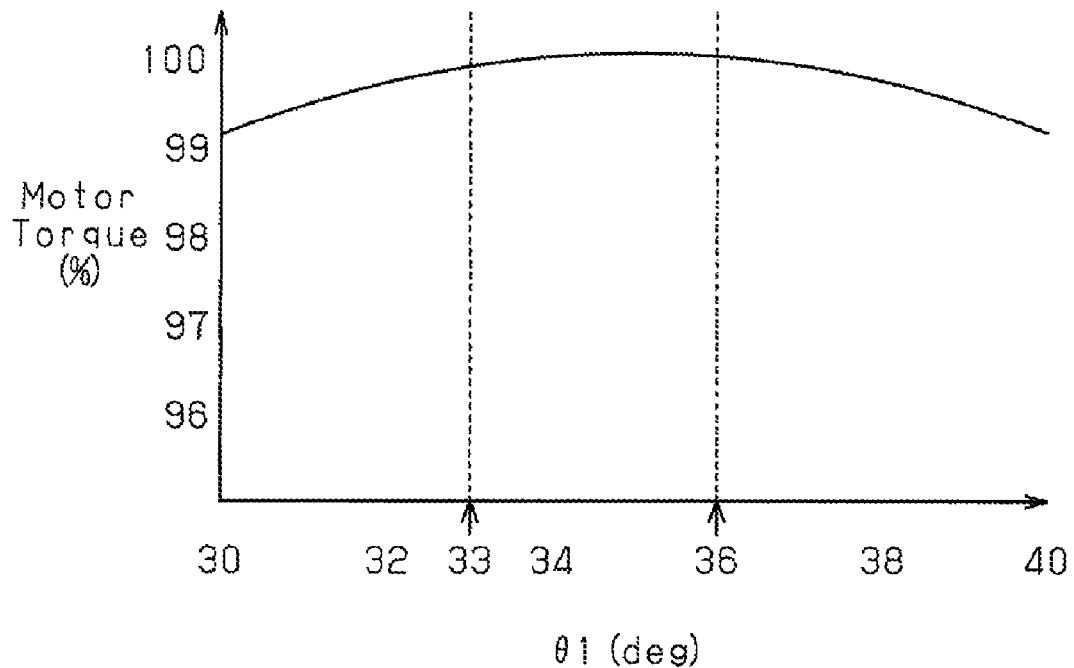
FIG. 7 is a graph showing the relationship between a first angle of nip defining the circumferential width of the first gaps and the motor torque.
Figure 8:
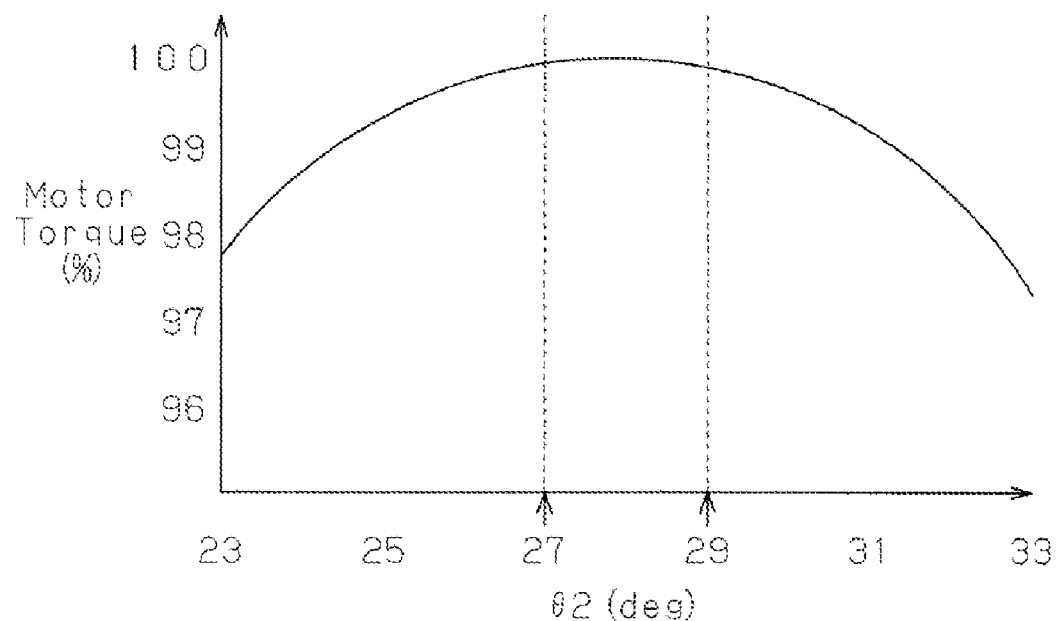
FIG. 8 is a graph showing the relationship between a second angle of nip defining the circumferential width of the second gaps and the motor torque.

Also, FIG. 7 is a graph showing the relationship between the first angle of nip θ1 (see FIGS. 2 and 4) and the torque of the motor 1. FIG. 8 is a graph showing the relationship between the second angle of nip θ2 (see FIGS. 2 and 4) and the torque of the motor 1.

Since the brushless motor 1 has twelve slots as described above, the first angle of nip θ1 is desirably greater than 30°. This is because the first angle of nip θ1 is preferably greater than the intervals between the teeth 3, which are 30°, to permit the advantage of the present embodiment to be effective. Since the second angle of nip θ2 needs to be less than the first angle of nip θ1, the second angle of nip θ2 is less than 30°.

Furthermore, the torque of the motor 1 reaches the maximum value (100%) when the first angle of nip θ1 is approximately 35°, and is ensured to be greater than or equal to 99.5% of the maximum value when the first angle of nip θ1 is in the range of 33° to 36° according to FIG. 7. Thus, the first angle of nip θ1 is preferably set within the range of 33° to 36°.

Similarly, the torque of the motor 1 reaches the maximum value (100%) when the second angle of nip θ2 is approximately 28°, and is ensured to be greater than or equal to 99.5% of the maximum value when the second angle of nip θ2 is in the range of 27° to 29° according to FIG. 8. Thus, the second angle of nip θ2 is preferably set within the range of 27° to 29°.

Figure 9:
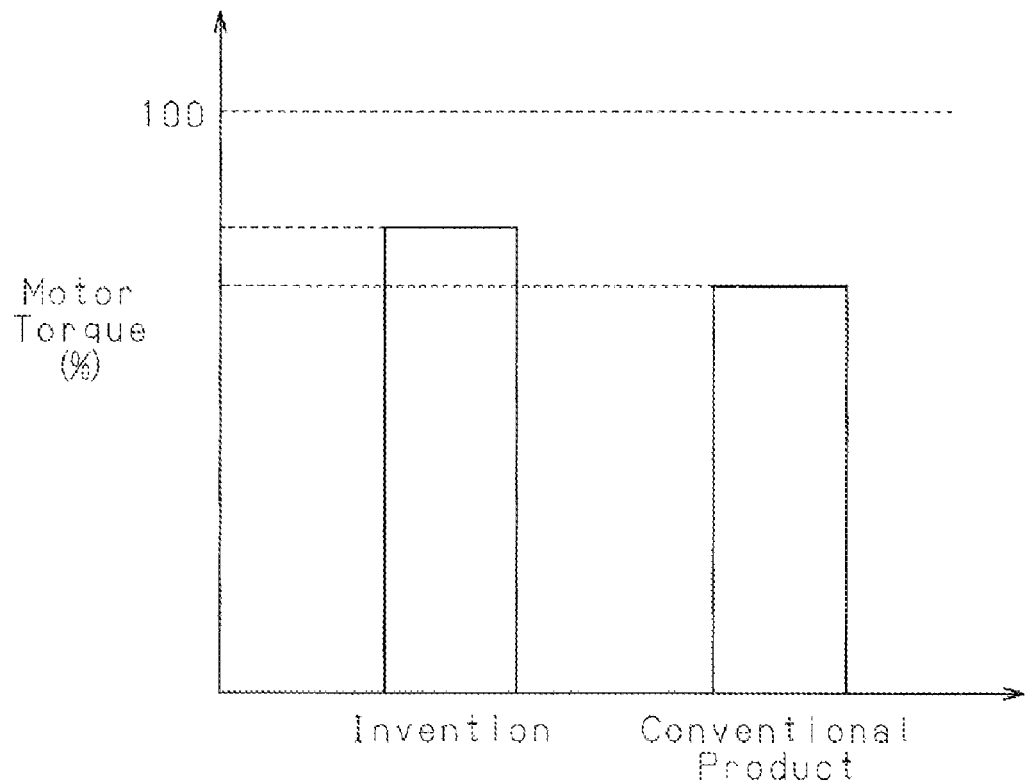
FIG. 9 is a diagram explaining the comparison of the motor torque between the motor of the first embodiment and the conventional motor.
Figure 42:
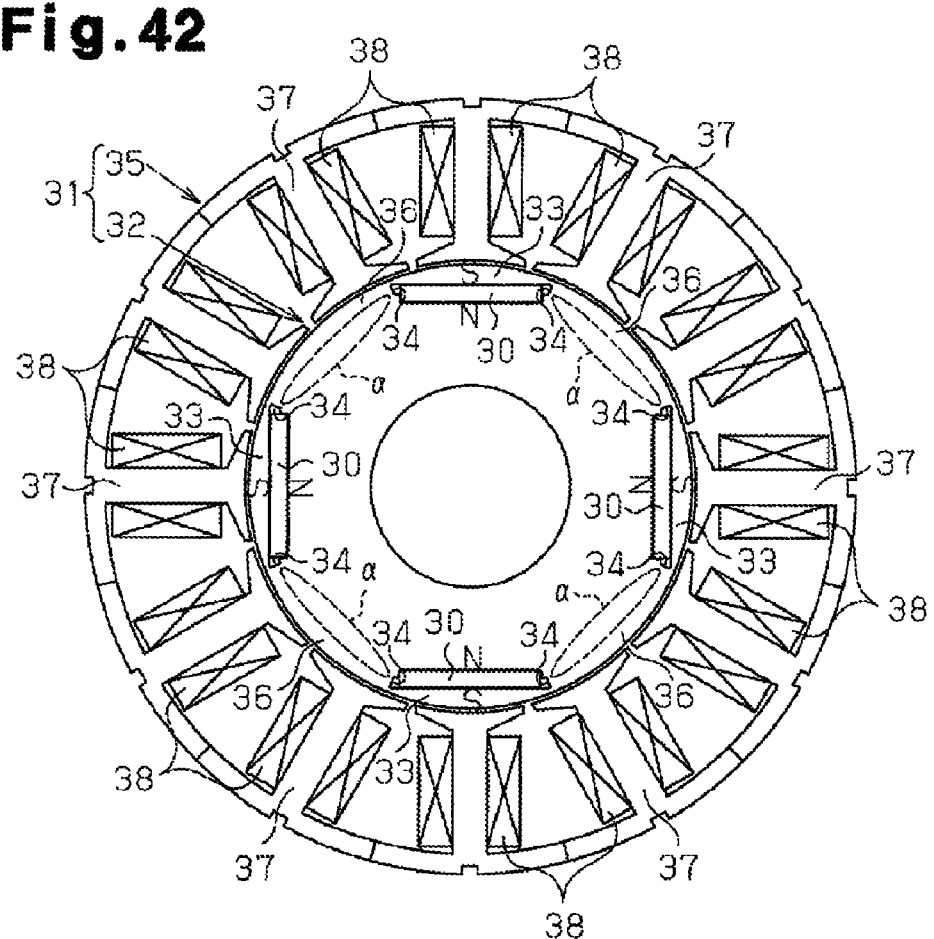
FIG. 42 is a schematic diagram illustrating a conventional brushless motor including a consequent pole rotor.
Figure 44:
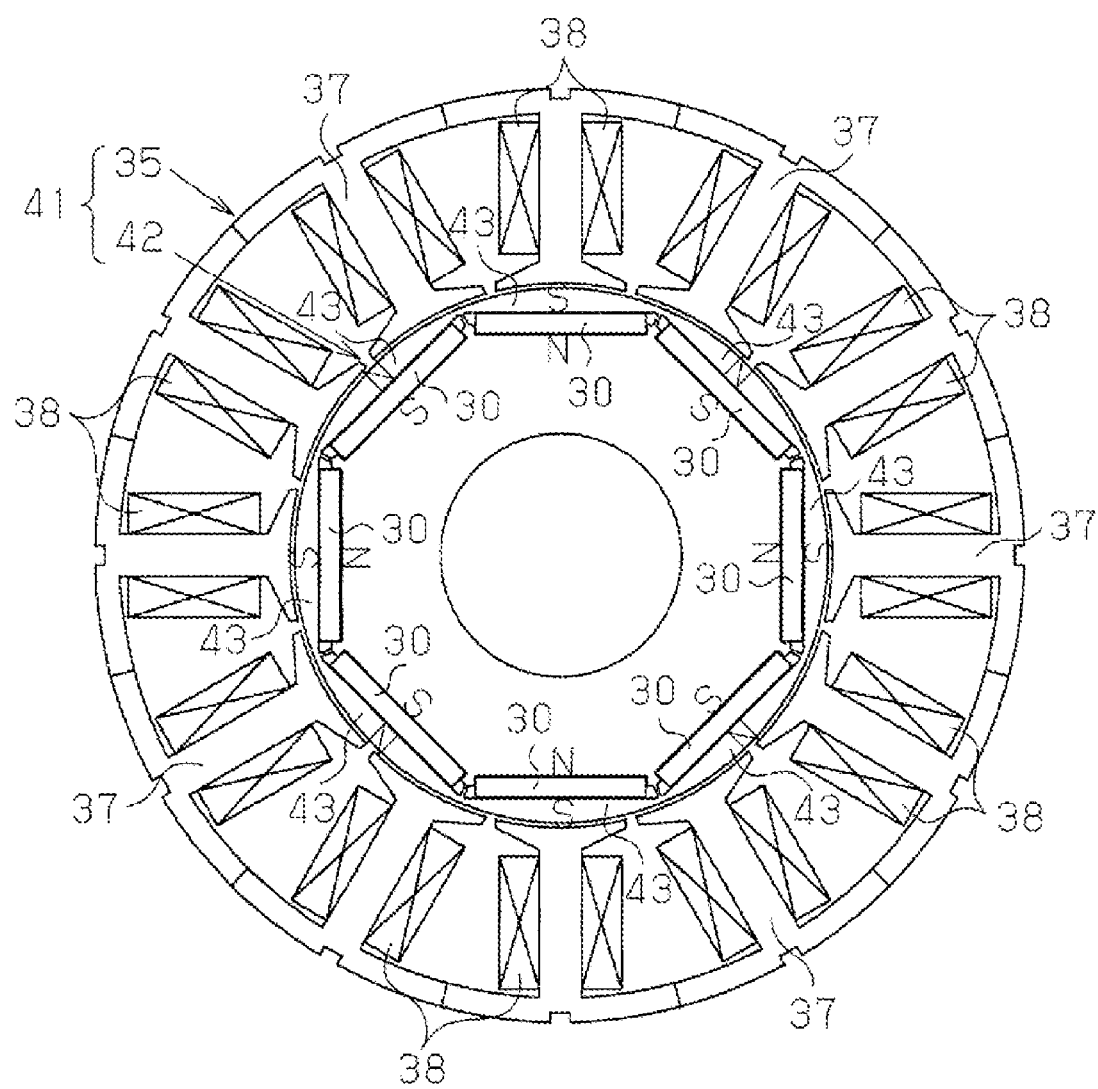
FIG. 44 is a schematic diagram illustrating a normal brushless motor including a general rotor.
Figure 45:
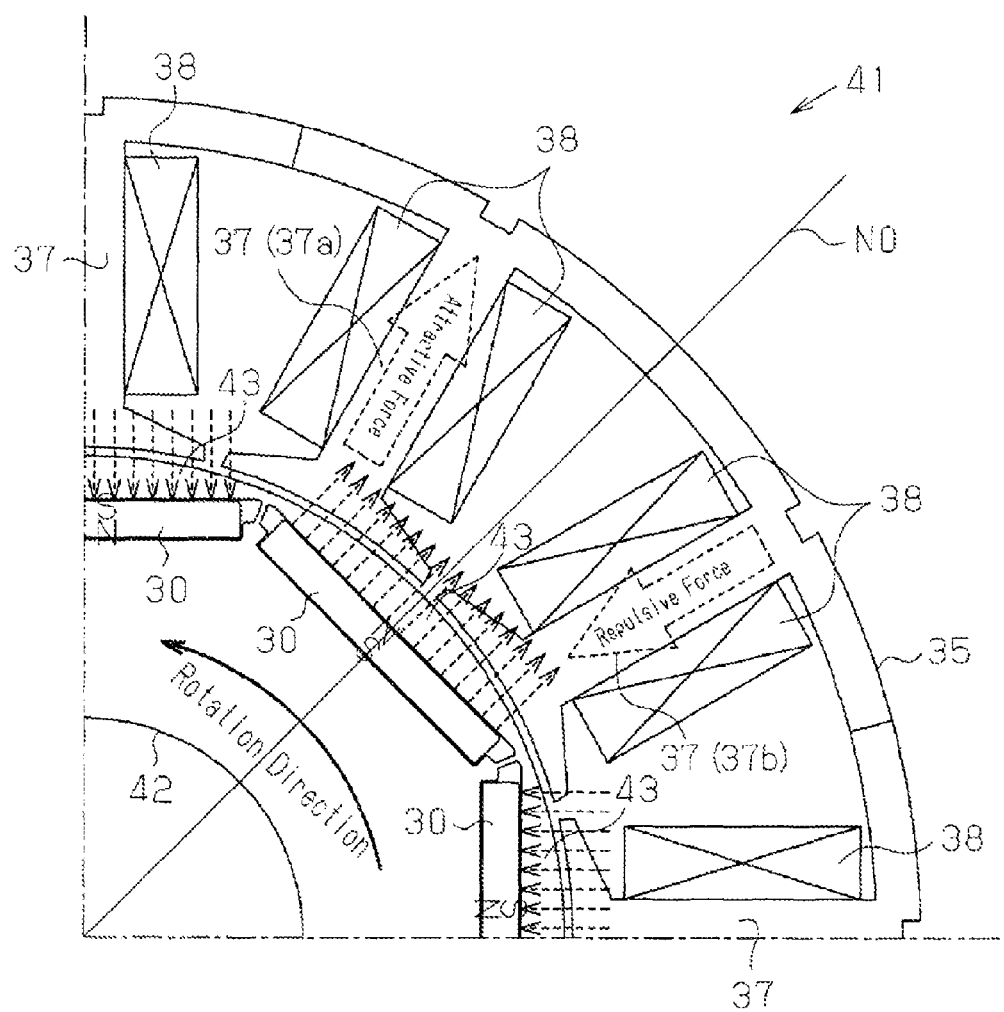
FIG. 45 is a diagram illustrating distribution of magnetic flux between the stator and the rotor of the brushless motor of FIG. 43.

Based on the above consideration, the rotor 6 is designed such that the fifth angle of nip θ5 is 18°, the first angle of nip θ1 is 35°, and the second angle of nip θ2 is 28° in the present embodiment. In the comparison of the brushless motor including the conventional consequent pole rotor (see FIG. 42) and the brushless motor 1 of the present embodiment, the torque of the motor 1 of the present embodiment is improved as shown in FIG. 9. In FIG. 9, the motor torque of the conventional brushless motor shown in FIG. 44 is set as 100%.

The present embodiment has the following advantages.

(1) The rotor 6 includes the magnetic pole portions 10, which are arranged at equal angular intervals along the circumferential direction of the rotor 6, and the magnetic pole portions 10 are arranged such that the polarities are the same. Also, the gaps 14 (14a, 14b) are formed at the circumferential ends of each pole portion 10. Thus, the iron core portion 16, which is magnetically divided from the pole portions 10 in the circumferential direction, is formed between the circumferentially adjacent magnetic pole portions 10. Also, the rotation direction of the rotor 6 is defined to be one direction. Among the gaps 14 (14a, 14b), the circumferential width W1 of the first gap 14a formed on the leading end is set to be greater than the circumferential width W2 of the second gap 14b formed on the trailing end.

With this structure, the magnetic center position is prevented from being shifted toward the leading end of the iron core portion 16 in the rotation direction, and fluctuation of the magnetic balance is reduced in the present embodiment. The improvement of the magnetic balance further improves the performance such as increasing the torque of the motor.

(2) The first angle of nip θ1 is set to be greater than the second angle of nip θ2. Thus, the circumferential width W1 of the first gap 14a is reliably set to be greater than the circumferential width W2 of the second gap 14b.

(3) The brushless motor 1 includes four magnetic pole portions 10, four iron core portions 16, and twelve slots.

That is, when one iron core portion 16 faces two teeth 3, all the other iron core portions 16 respectively face two teeth 3 in the same manner since the number of slots is a multiple of the number of the iron core portions. Thus, the brushless motor 1 configured as described above more effectively exert the advantage (1).

(4) The first angle of nip θ1 is set to be greater than 30°, and the second angle of nip θ2 is set to be less than 30°.

That is, the brushless motor 1 is substantially the same as the 8-pole 12-slot brushless motor since the brushless motor 1 includes four magnetic pole portions 10 and four iron core portions 16. Thus, the first angle of nip θ1 is preferably greater than 30° to more effectively exert the advantage (1). The second angle of nip θ2 is less than 30° since the second angle of nip θ2 needs to be less than the first angle of nip θ1.

(5) The rotor 6 is designed such that the fifth angle of nip θ5 that defines the circumferential width W5 of the magnetic pole portions 10 is 18°, the first angle of nip θ1 that defines the circumferential width W1 of the first gaps 14a is 35°, and the second angle of nip θ2 that defines the circumferential width W2 of the second gaps 14b is 28°.

This optimizes the relationship between the magnetic pole portions 10 and the iron core portions 16. As a result, the improvement of the magnetic balance further improves the performance such as increase in the torque of the motor 1.

(6) The magnetic pole portions 10 are formed by the plate-like permanent magnets 11 embedded in the vicinity of the peripheral portion of the rotor core 8. The first gaps 14a are formed to be open in the circumferential surface 18 of the rotor 6 (rotor core 8).

With this structure, the magnetic resistance of the first gaps 14a is increased, thereby further reducing the influence of the magnetic repulsive force generated between the tooth 3 (3b) located to face the trailing section of the iron core portion 16 and part of the iron core portion 16 facing the tooth 3b.

Hereinafter, further embodiments of the present invention will be described. In each of the embodiments, the same reference numerals are given to those components that are the same as the corresponding components of the first embodiment, and drawings and all or part of the explanations are omitted.

A brushless motor (IPM motor) 1B according to a second embodiment will be described with reference to FIGS. 10 and 11.

Figure 10:
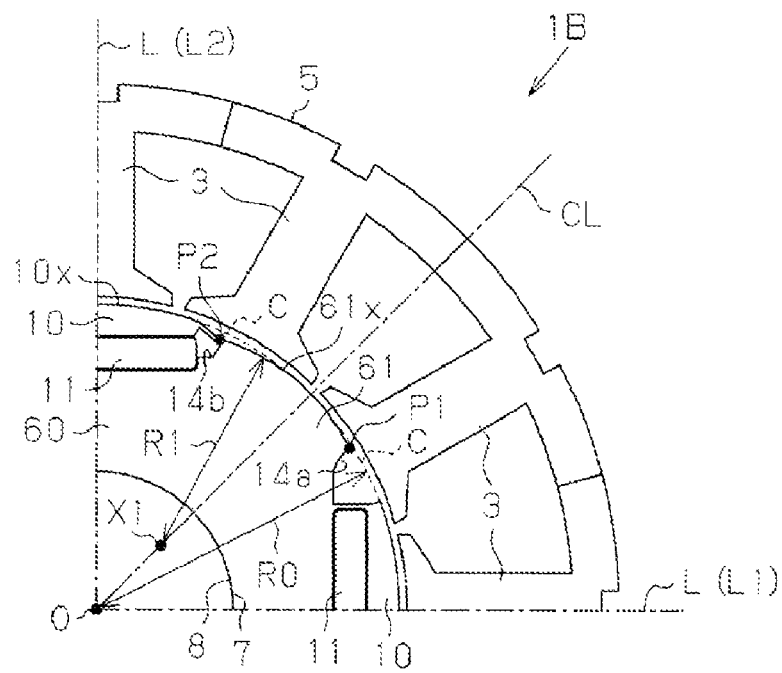
FIG. 10 is a diagram explaining the shape of a rotor of a brushless motor according to a second embodiment of the present invention.

FIG. 10 shows part of a cross-section of the motor 1B according to the second embodiment. FIG. 10 shows an iron core portion 61 of a rotor 60 of the second embodiment. A circumferential center portion of an outer side surface 61x of the iron core portion 61 is located on an imaginary reference circumferential surface C for example, the radius from the rotor center O is 22 mm) formed by connecting outer side surfaces 10x of all the magnetic pole portions 10. The outer side surface 61x is curved such that it separates radially inward from the circumferential surface C as the distance from the circumferential ends decreases. That is, the outer side surface 61x of the iron core portion 61 has a greater curvature than the circumferential surface C. In other words, the outer side surface 61x has a small curvature radius so that, toward the end portions from the circumferential center portion, the outer side surface 61x separates from the stator 5 (teeth 3).

Also, the outer side surface 61x of the iron core portion 61 is formed to match an arc having its center at a predetermined point X1 located on a straight line CL (a straight line displaced from the straight line L2 and the straight line L1 by 45 degrees) that passes through the circumferentially intermediate position between the circumferentially adjacent magnetic pole portions 10 and the center O of the rotor 60, and having a radius R1. Thus, the end P2 located on the leading end of the iron core portion 61 is arranged radially inward of the end P1 located on the trailing end of the iron core portion 61 from the stator 5 (teeth 3).

Figure 11:
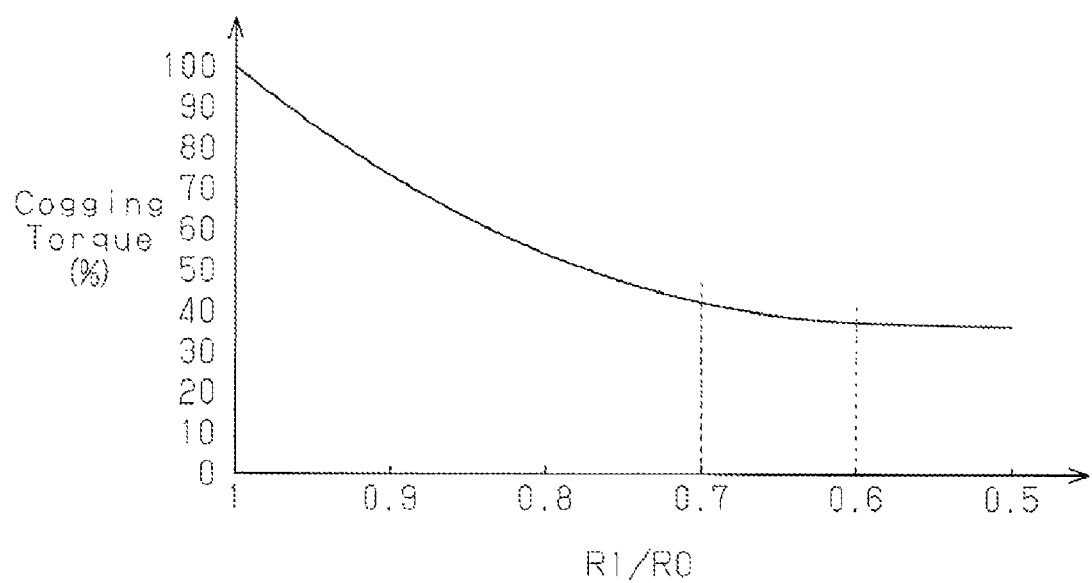
FIG. 11 is a graph showing the relationship between the shape of the rotor of FIG. 10 and the cogging torque.

When the radius of the circumferential surface C is R0 and the radius of the outer side surface 61x of the iron core portion 61 is R1, the cogging torque of the rotor 60 when the ratio R1/R0 is changed is shown in FIG. 11. FIG. 11 shows the results when the fifth angle of nip θ5 is approximately 18°, the first angle of nip θ1 is approximately 35°, and the second angle of nip θ2 is approximately 28° as described in the first embodiment.

Also, in FIG. 11, the cogging torque is assumed to be 100% when the ratio R1/R0 is 1, that is, when the curvature of the outer side surface 61x of the iron core portion 61 is the same as the curvature of the circumferential surface C. The cogging torque is gradually reduced as the ratio R1/R0 is reduced, that is, as the curvature of the outer side surface 61x of the iron core portion 61 becomes greater than that of the circumferential surface C. In the range where the R1/R0 is $0.7 \leq R1/R0 < 1$, the cogging torque is reduced at a relatively great rate. The reduction rate of the cogging torque is reduced as the ratio R1/R0 becomes less than 0.7, and the reduction rate of the cogging torque is further reduced from the point where the ratio R1/R0 approaches 0.6. When the ratio R1/R0 is 0.6, the cogging torque is reduced to approximately 37%. Also, the reduction rate of the cogging torque becomes almost zero when the ratio R1/R0 becomes less than 0.6.

Based on the above description, the curvature of the outer side surface 61x of the iron core portion 61 is set such that the ratio R1/R0 is within the range of $0.6 \leq R1/R0 < 1$ in the rotor 60 of the present embodiment. In particular, when taking into consideration of only the reduction of the cogging torque, the ratio R1/R0 is desirably within the range of $0.6 \leq R1/R0 \leq 0.7$, and when taking into consideration of the reduction rate of the cogging torque, the effect is expected even when the ratio R1/R0 is within the range of $0.7 \leq R1/R0 < 1$. Thus, in the present embodiment, rapid change of the magnetic flux density that might cause between the magnetic pole portions 10 and the iron core portions 61 is reduced, and the cogging torque is reduced.

Next, the present embodiment has the following advantages.

(7) The outer side surface 61x of each iron core portion 61 is structured such that the outer side surface 61x gradually separates radially inward from the reference circumferential surface C, which is formed by connecting the outer side surfaces 10x of the magnetic pole portions 10, as the distance from the circumferential ends P1, P2 decreases. Since the gap in the radial direction between each iron core portion 61 and the stator 5 is gradually increased toward the circumferential ends P1, P2 of the iron core portion 61, the degree of change of the magnetic flux density in the vicinity of the magnetic pole end portions of the iron core portion 61 is reduced accordingly, and the degree of change of the magnetic flux density in the vicinity of the circumferential center of the iron core portion 61 is also reduced. The rapid change of the magnetic flux density is thus inhibited, that is, the cogging torque is reduced.

(8) The entire outer side surface 61x of the iron core portion 61 has a curved shape with a certain curvature. The ratio R1/R0 of the radius R1 of the curvature of the outer side surface 61x and the radius R0 of the reference circumferential surface C is set within the range of $0.6 \leq R1/R0 < 1$. Thus, the cogging torque is reduced (see FIG. 11). Also, the closer to 0.6 the R1/R0 becomes in the above mentioned range, the more reduced the cogging torque becomes.

The first and second embodiments may be modified as follows.

In the second embodiment, the relationship between the ratio R1/R0 and the cogging torque when the fifth angle of nip θ5 is approximately 18°, the first angle of nip θ1 is approximately 35°, and the second angle of nip θ2 is approximately 28° is explained, but not limited to this. For example, the cogging torque is reduced in the same manner as the second embodiment even if the fifth angle of nip θ5 is in the range of 17° to 19°, the first angle of nip θ1 is in the range of 33° to 36°, and the second angle of nip θ2 is in the range of 27° to 29° as shown in FIGS. 6 to 8.

Figure 12:
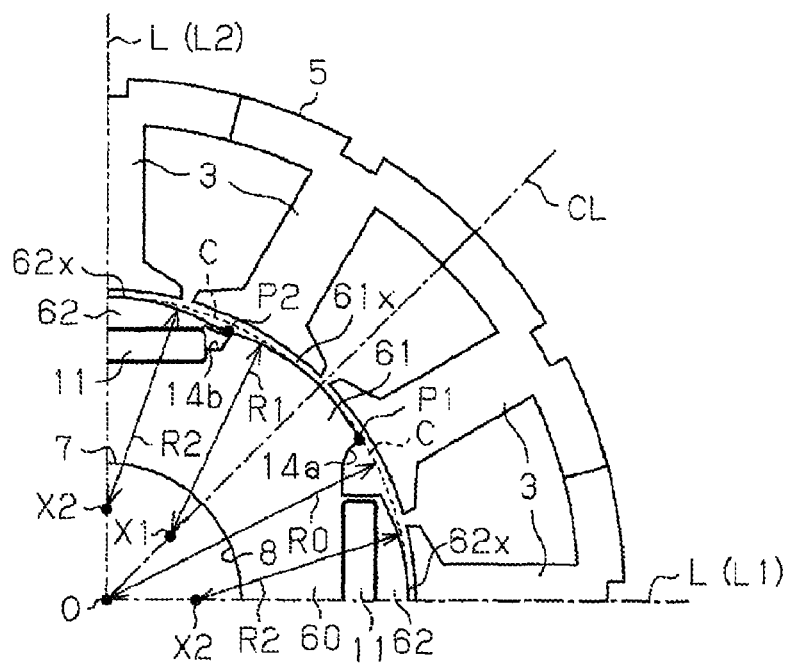
FIG. 12 is a diagram explaining the shape of a rotor of a motor according to a modified embodiment of the first and second embodiments.

In the second embodiment, the cogging torque is reduced by changing the curvature of the outer side surface 61x of the iron core portion 61 from the curvature of the imaginary reference circumferential surface C formed by connecting the outer side surfaces 10x of all the magnetic pole portions 10. In addition, the curvature of the outer side surfaces 10x of the magnetic pole portions 10 may be changed from the curvature of the circumferential surface C as shown in FIG. 12. More specifically, as shown in FIG. 12, pole portions 62 are formed such that the circumferential center portion of a radially outer side surface 62x is located on the reference circumferential surface C, and the outer side surface 62x curves such that it separates away radially inward from the circumferential surface C as the distance from the circumferential ends is decreased. That is, the outer side surface 62x of each magnetic pole portion 62 has a greater curvature or a smaller curvature radius than the circumferential surface C, and is formed such that, toward the end portions from the circumferential center portion, the outer side surface 62x gradually separates from the stator 5 (teeth 3). The pole portions 62 are each formed to match an arc having its center at a predetermined point X2 located on the straight line L1 and the straight line L2, and having a radius R2. In FIG. 12, the point X2 is set such that the distance between the point X2 and the center O of the rotor 60 is equal to the distance between the point X1 and the center O of the rotor 60. That is, the outer side surfaces 62x of the magnetic pole portions 62 are formed such that the radius R1 and the radius R2 are equal to each other.

Figure 13:
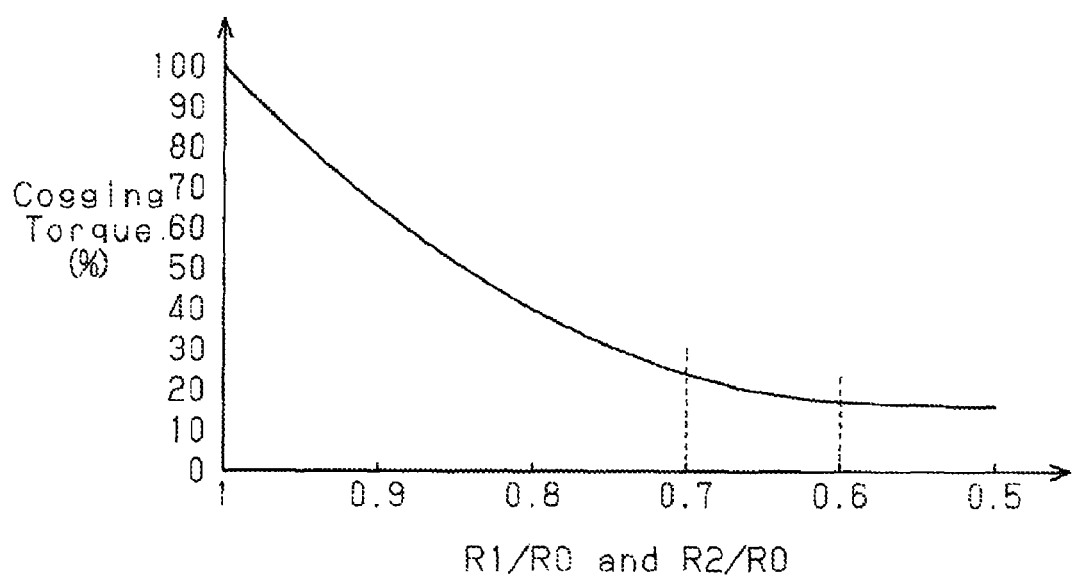
FIG. 13 is a graph showing the relationship between the shape of the rotor according to the modified embodiment of the first and second embodiments and the cogging torque.

FIG. 13 shows the cogging torque of the rotor 60 when the ratio R1/R0 of the radius R0 of the circumferential surface C and the radius R1 of the outer side surface 61x of the iron core portion 61, and the ratio R2/R0 of the radius R0 of the circumferential surface C and the radius R2 of the outer side surface 62x of the pole portion 62 are changed. FIG. 13 shows the results of when the fifth angle of nip θ5 is approximately 18°, the first angle of nip θ1 is approximately 35°, and the second angle of nip θ2 is approximately 28° as in the second embodiment. With this structure, the same result as FIG. 13 is obtained when the fifth angle of nip θ5 is within the range of 17° to 19°, the first angle of nip θ1 is within the range of 33° to 36°, and the second angle of nip θ2 is within the range of 27° to 29° as shown in FIGS. 6 to 8.

In FIG. 11, the cogging torque is assumed to be 100% when R1/R0=R2/R0=1, that is, when the curvature of the outer side surface 61x of the iron core portion 61 and the curvature of the outer side surface 62x of the pole portion 62 are equal to the curvature of the circumferential surface C. The cogging torque is gradually reduced as the ratio R1/R0 and the ratio R2/R0 are reduced. The cogging torque is reduced at a relatively great rate in the range in which the ratio R1/R0 and the ratio R2/R0 are $0.7 \leq R1/R0 = R2/R0 < 1$. The reduction rate of the cogging torque is reduced as the ratio R1/R0 and the ratio R2/R0 become less than 0.7, the reduction rate of the cogging torque is further reduced from the vicinity of the ratio R1/R0=R2/R0=0.6, and the cogging torque is reduced to about 16% when the ratio R1/R0=R2/R0=0.6. That is, the cogging torque is further reduced by changing both the curvature of the outer side surfaces 61*x* of the iron core portions 61 and the curvature of the outer side surfaces 62*x* of the magnetic pole portions 62 from the curvature of the circumferential surface C.

In the above-mentioned structure, the radius R2 and the radius R1 are equal to each other, but not limited to this. The radius R1 may be greater than the radius R2, and alternatively, the radius R1 may be less than the radius R2, as long as the radii R1, R2 are both less than the radius R0 of the circumferential surface C.

In the first and second embodiments, the rotor 6 includes four magnetic pole portions 10 and four iron core portions 16, and the stator 5 includes twelve slots (teeth 3). However, as long as the brushless motor includes the consequent pole rotor that forms iron core portions between adjacent pole portions, the number of the magnetic pole portions (the number of the iron core portions) and the number of the slots may be changed. As described in the advantage (3) of the first embodiment, more significant effect is obtained with the structure in which the number of the slots is a multiple of the number of the iron core portions.

In the first and second embodiments, the present invention is embodied in the embedded permanent magnet (IPM) rotor 6 in which the magnetic pole portions 10 are formed by the permanent magnets 11 embedded in the peripheral portion of the rotor core 8. However, the present invention may be embodied in a rotor in which the magnetic pole portions are formed by permanent magnets secured to the circumferential surface of the rotor.

Figure 14:
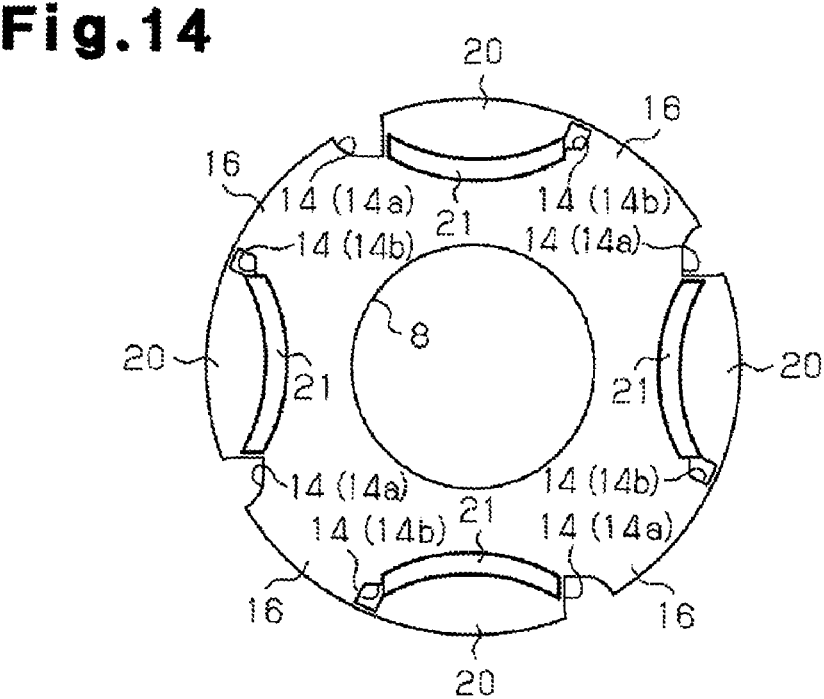
FIG. 14 is a plan view illustrating the rotor core according to a modified embodiment of the first and second embodiments.
Figure 15:
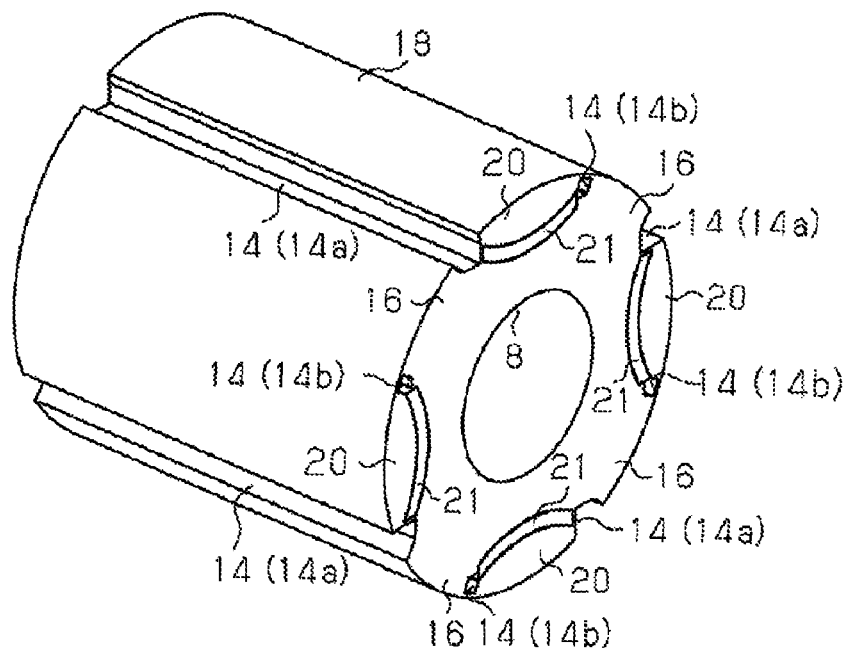
FIG. 15 is a perspective view illustrating the rotor core of FIG. 14.
Figure 16:
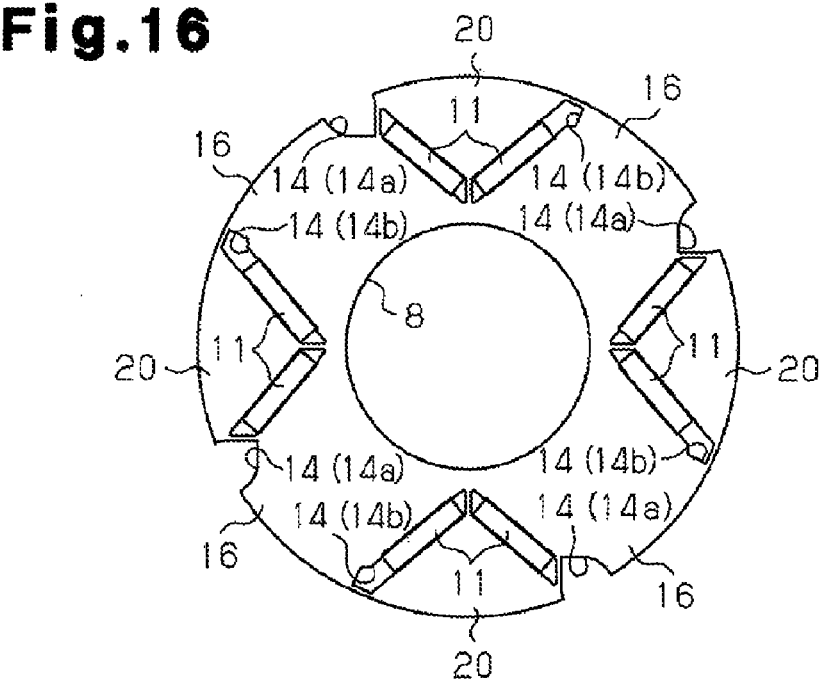
FIG. 16 is a plan view illustrating the rotor core according to a modified embodiment of the first and second embodiments.
Figure 17:
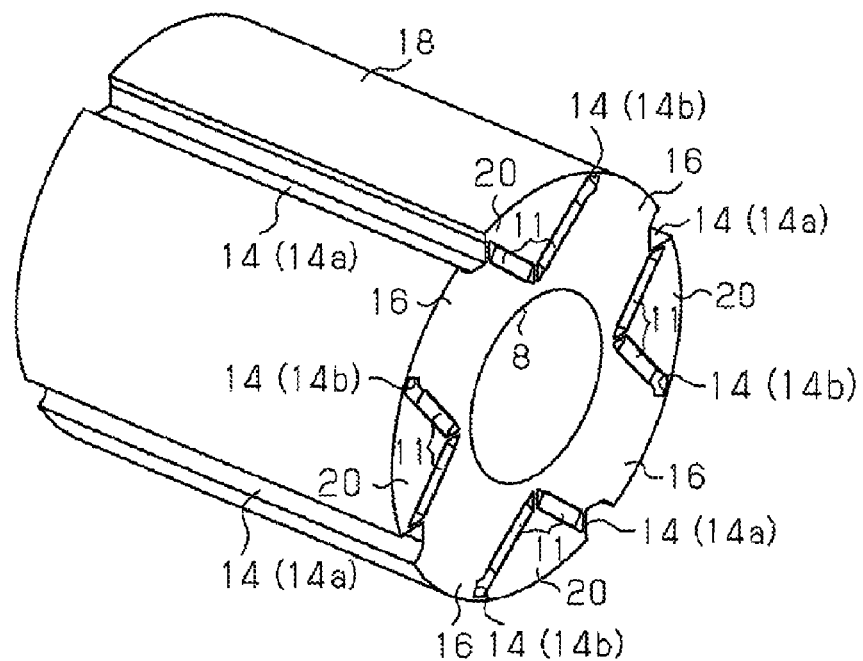
FIG. 17 is a perspective view of the rotor core of FIG. 16.

In the first and second embodiments, the magnetic pole portions 10 are formed using the plate-like permanent magnets 11. However, the present invention may be embodied in the structure in which the magnetic pole portions 20 are formed by curved plate-like permanent magnets 21 as shown in FIGS. 14 and 15, or in the structure in which the plate-like permanent magnets 11 are arranged in V-shapes to form the magnetic pole portions 20 as shown in FIGS. 16 and 17.

Figure 18:
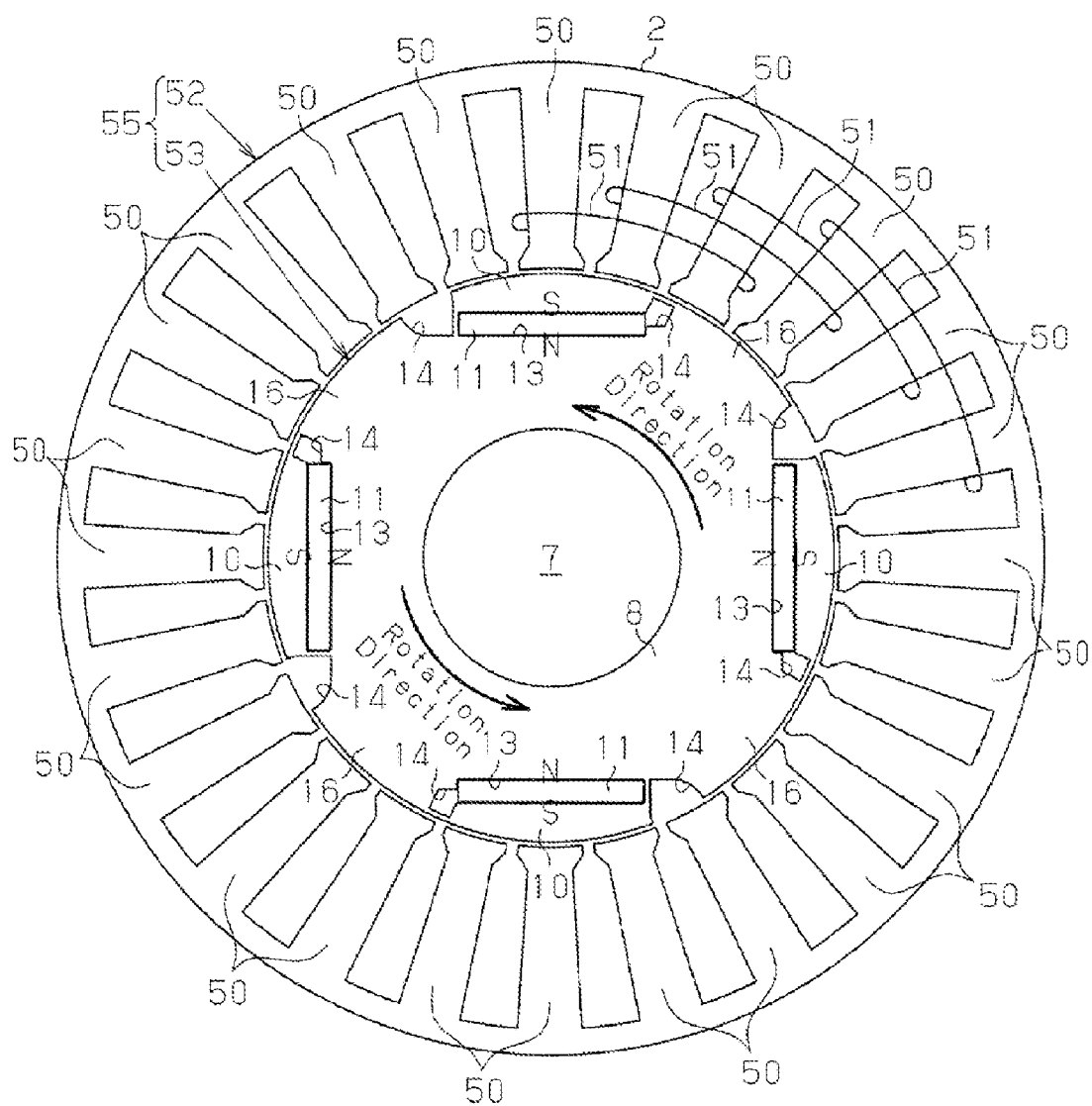
FIG. 18 is a schematic diagram illustrating a brushless motor according to a modified embodiment of the first and second embodiments.
Figure 19:
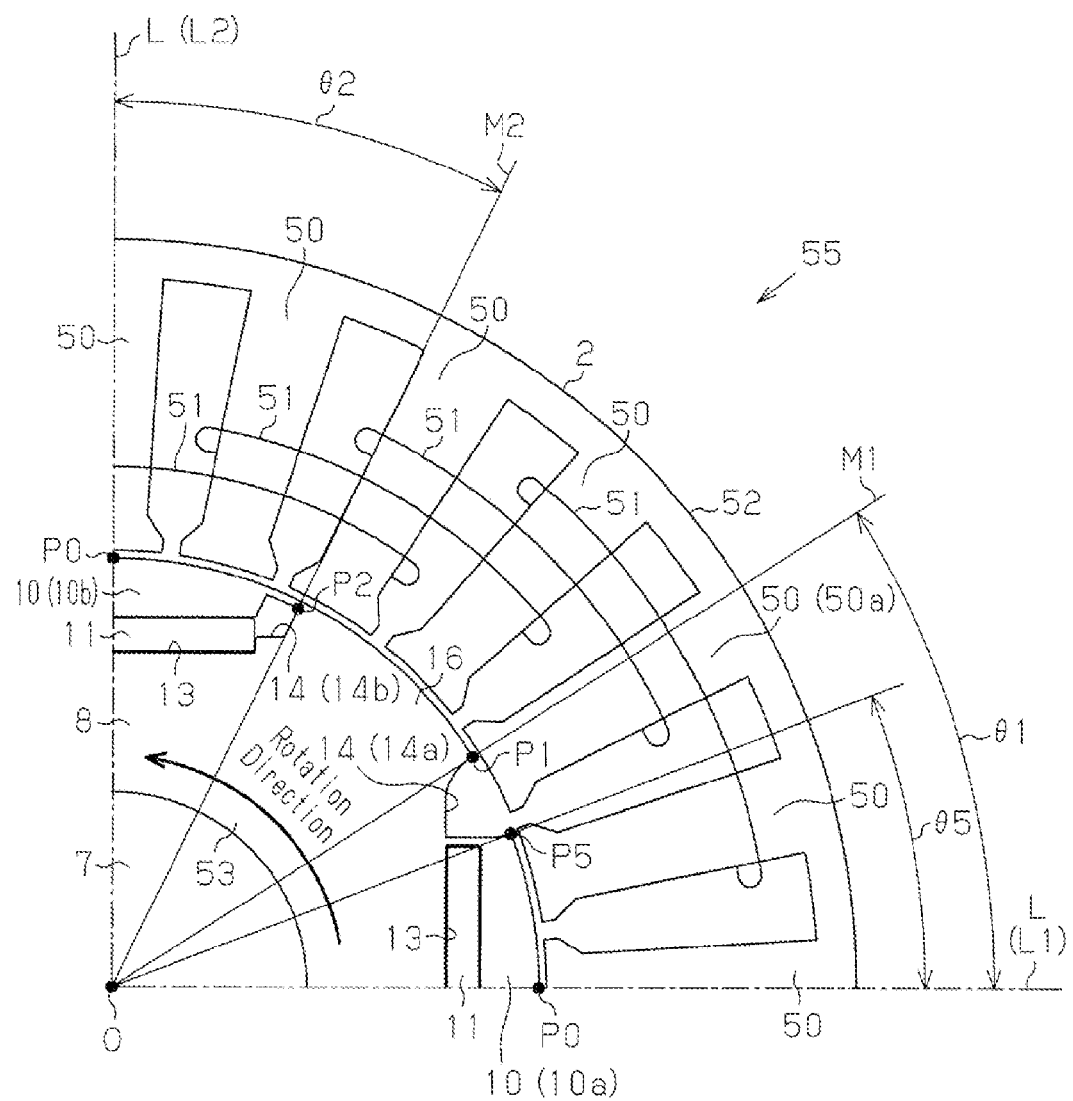
FIG. 19 is an explanatory diagram showing the relationship between the magnetic pole portions formed in the rotor of the brushless motor according to the modified embodiment of the first and second embodiments and gaps formed on both ends of each magnetic pole portion, and the iron core portions.

In the first and second embodiments, the stator 5 is formed by concentrated winding, in which the coils 4 are wound around each of the teeth 3, but for example, a stator 52 may be formed by distributed winding, in which coils 51 are wound around several (for example, three) teeth 50 as shown in FIGS. 18 and 19. With this structure also, the advantages that are the same as the above embodiments are obtained. The number of the teeth 50 of the stator 52 formed by distributed winding may be changed as required in accordance with the number of the poles. For example, the stator 52 of a motor 55 shown in FIGS. 18 and 19 includes twenty-four teeth 50, and twenty-four slots.

With this structure also, since the number of the slots is a multiple of the number of the iron core portions, when one iron core portion 16 faces three teeth 50, all the other iron core portions 16 respectively face three teeth 50 in the same manner.

Figure 20:
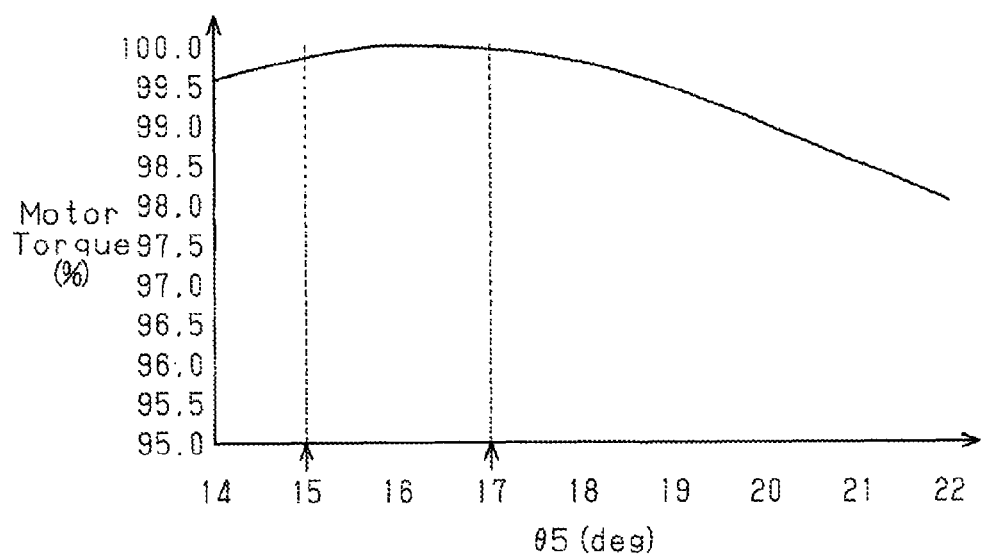
FIG. 20 is a graph showing the relationship between the fifth angle of nip of the brushless motor according to the modified embodiment of the first and second embodiments and the motor torque.

With this structure, the fifth angle of nip $\theta 5$ is preferably approximately 16°, for example, as shown in FIG. 19 like the above-mentioned embodiments. For example, the torque of the motor 55 shows the maximum value (100%) when the fifth angle of nip $\theta 5$ is approximately 16°, and ensures 99.5% or more of the maximum value when the fifth angle of nip $\theta 5$ is within the range of 15° to 17° as shown in FIG. 20. Thus, the fifth angle of nip $\theta 5$ is preferably set to be within the range of 15° to 17°.

Figure 21:
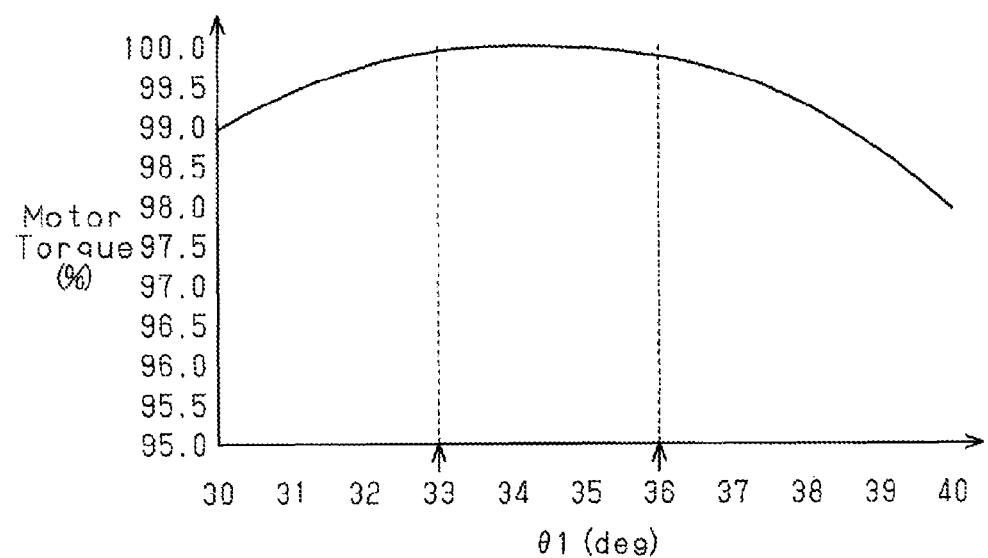
FIG. 21 is a graph showing the relationship between the first angle of nip of the brushless motor, according to the modified embodiment of the first and second embodiments and the motor torque.

Also, the first angle of nip $\theta 1$ is preferably approximately 34°. For example, the torque of the motor 55 reaches the maximum value (100%) when the first angle of nip $\theta 1$ is approximately 34°, and ensures 99.5% or more of the maximum value when the first angle of nip $\theta 1$ is within the range of 33° to 36° as shown in FIG. 21. Thus, the first angle of nip $\theta 1$ is preferably set within the range of 33° to 36°.

Figure 22:
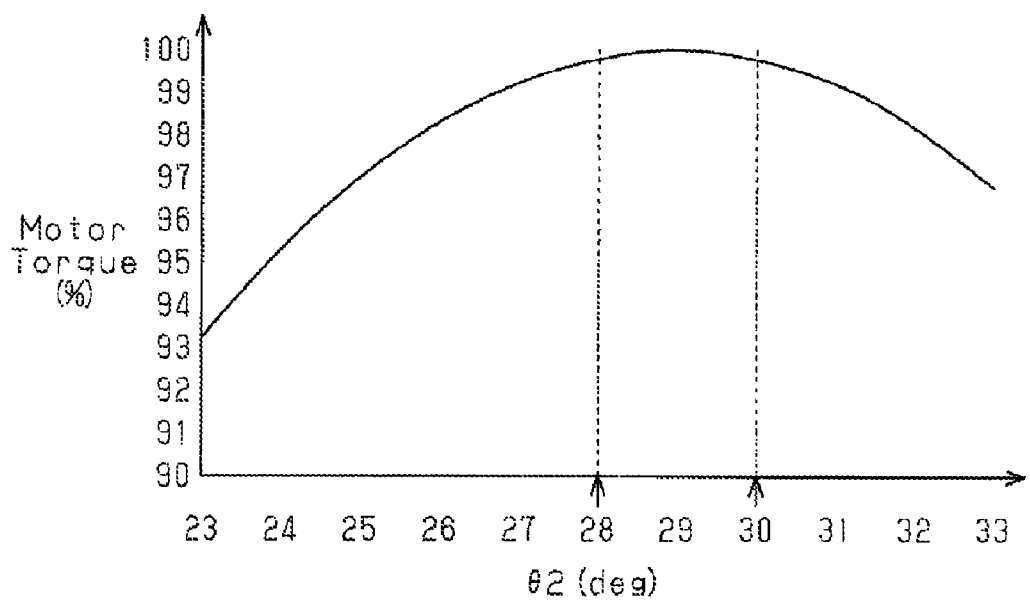
FIG. 22 is a graph showing the relationship between the second angle of nip of the brushless motor according to the modified embodiment of the first and second embodiments and the motor torque.

Furthermore, the second angle of nip $\theta 2$ is preferably set to be approximately 29°. For example, the torque of the motor 55 reaches the maximum value (100%) when the second angle of nip $\theta 2$ is approximately 29°, and ensures 99.5% or more of the maximum value when the second angle of nip $\theta 2$ is within the range of 28° to 30° as shown in FIG. 22. Thus, the second angle of nip $\theta 2$ is preferably set within the range of 28° to 30°.

Figure 23:
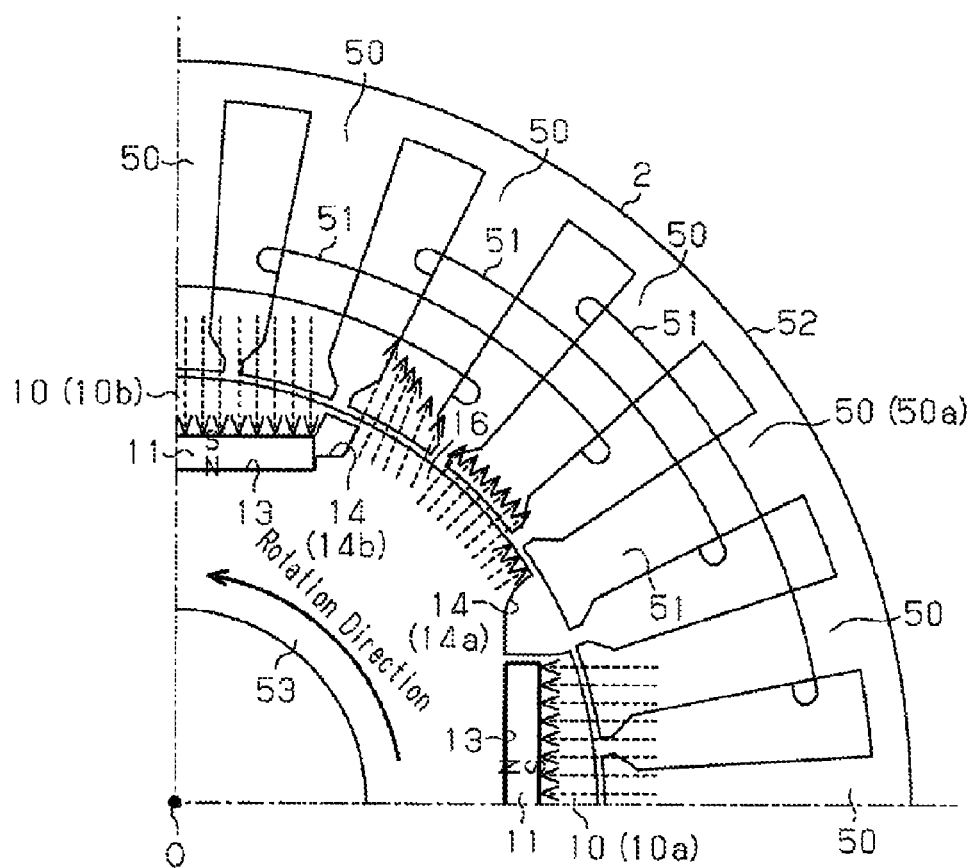
FIG. 23 is a diagram for explaining the operation of the brushless motor according to the modified embodiment of the first and second embodiments.
Figure 24:
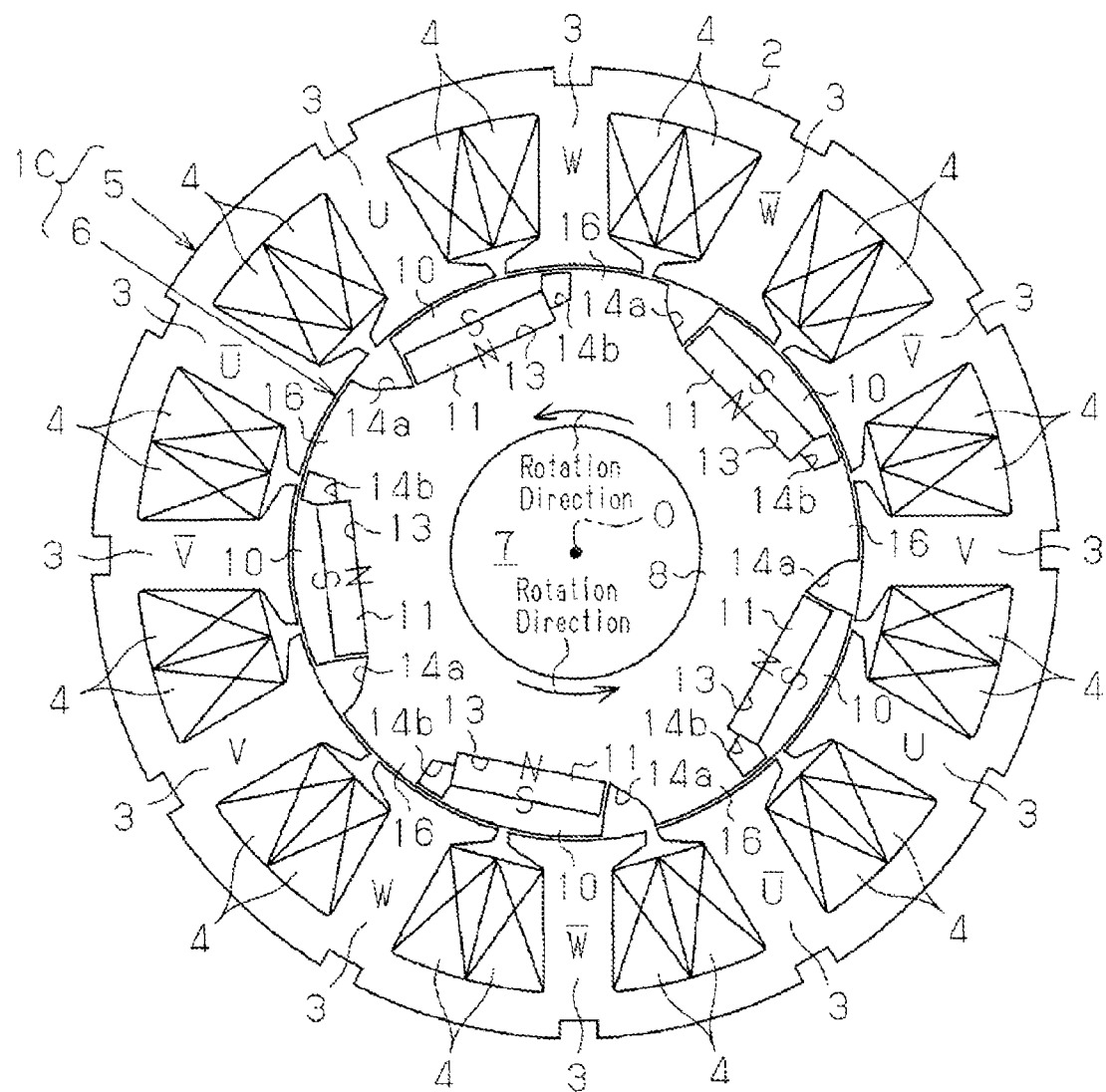
FIG. 24 is a schematic diagram illustrating a brushless motor according to a third embodiment the present invention.

Furthermore, the first gaps 14*a* are formed to open in the circumferential surface 18 of the rotor 53 (rotor core 8) also in the brushless motor 55 including the stator 52 formed by distributed winding. Thus, the magnetic resistance of the first gaps 14*a* is increased. Therefore, as described in the first embodiment, the structure further reduces the influence of the magnetic repulsive force between the iron core portion 16 and the teeth 50*a* located in the rear direction of the rotation of the rotor 53 among the teeth 50*a* facing the iron core portion 16. Thus, the difference between the magnetic flux density at the leading end and the magnetic flux density at the trailing end in the iron core portion 16 is relatively small as shown by the length of the dashed arrows in FIG. 23, and the magnetic balance is satisfactory. Thus, the torque is further increased in the brushless motor 55 including the stator 52 formed by distributed winding.

A brushless motor 1C according to a third embodiment of the present invention will now be described with reference to FIGS. 24 to 32.

In the present embodiment, the coils 4 are formed by three phases including a U-phase, a V-phase, and a W-phase. Three phases are arranged such that forward winding and reverse winding are located side by side per each phase, such as in the order of a W-phase (forward winding), a $\overline{\text{W}}$-phase (reverse winding), a $\overline{\text{V}}$-phase, a V-phase, a U-phase, a $\overline{\text{U}}$-phase, a $\overline{\text{W}}$-phase, a W-phase, a V-phase, a $\overline{\text{V}}$-phase, a $\overline{\text{U}}$-phase, and a U-phase in the clockwise direction of FIG. 24. Three-phase (U-phase, V-phase, W-phase) alternating current is supplied to the coils 4 wound around the teeth 3.

The rotor 6 of the present embodiment includes five magnetic pole portions 10 on the peripheral portion of the rotor 6.

More specifically, as shown in FIGS. 24 to 32, the magnet accommodating holes 13, which extend along the axial direction of the rotor 8, are provided in the vicinity of the peripheral portion of the rotor core 8 at intervals of approximately 72° in the circumferential direction. The permanent magnets 11 are accommodated in and secured to the magnet accommodating holes 13 in the state where the permanent magnets 11 are perpendicular to the radial direction of the rotor core 8.

Figure 25:
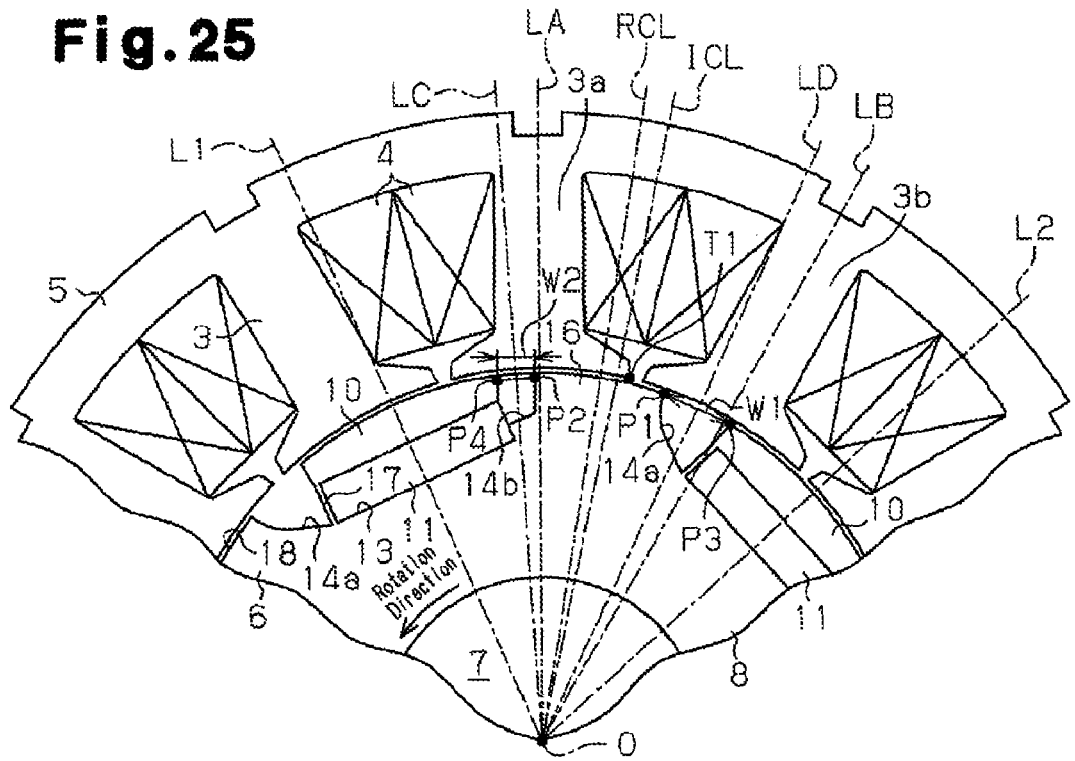
FIG. 25 is an explanatory diagram showing the relationship between the pole portions formed in the rotor of FIG. 24 and gaps formed on both ends of each pole portion, and the iron core portions.

In the present embodiment, the number of the teeth 3 is not a multiple of the number of the permanent magnets 11, and is greater than the number of the poles. As shown in FIG. 25, the circumferential width W1 of the first gaps 14*a* is formed to be greater than the circumferential width W2 of the second gaps 14*b*.

Figure 26:
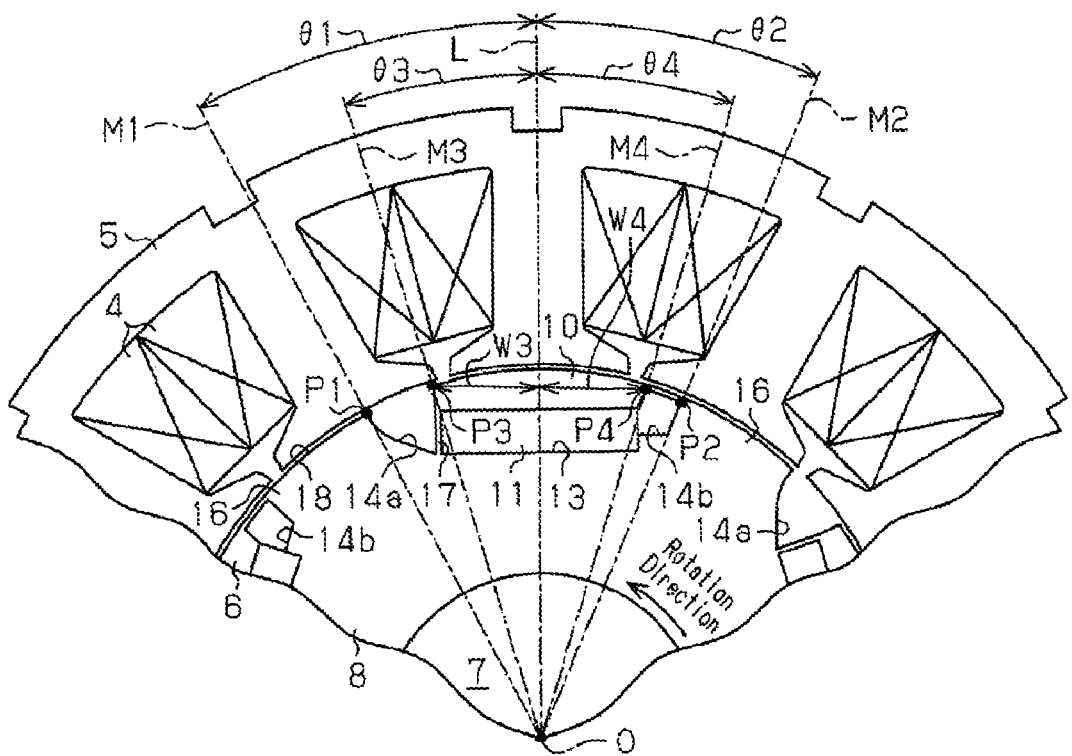
FIG. 26 is an explanatory diagram showing the relationship between the pole portions formed in the rotor in FIG. 24 and gaps formed on both ends of each pole portion, and the iron core portions.

More specifically, as shown in FIG. 26, the angle defined by a straight line L (L1, L2) that passes through the center O of the rotor 6 and the circumferential center position of the pole portion 10 and a straight line M3 that passes through the center O of the rotor 6 and an end P3 located on the trailing end of the first gap 14*a* is referred to as a third angle of nip $\theta 3$, and the angle defined by the straight line L (L1, L2) that passes through the center O of the rotor 6 and the circumferential center position of the pole portion 10 and a straight line M4 that passes through the center O of the rotor 6 and an end P4 located on the leading end of the second gap 14b is referred to as a fourth angle of nip θ4.

Since the plate-like permanent magnets 11 forming the magnetic pole portions 10 are arranged at equal intervals in the circumferential direction of the rotor core 8, the third angle of nip θ3 is equal to the fourth angle of nip θ4. Thus, the circumferential width W1 of the first gap 14a is greater than the circumferential width W2 of the second gap 14b by setting the first angle of nip θ1 to be greater than the second angle of nip θ2 as described above.

The design for optimizing the angles of nip (θ1, θ2, θ3, θ4) will now be described.

Figure 29:
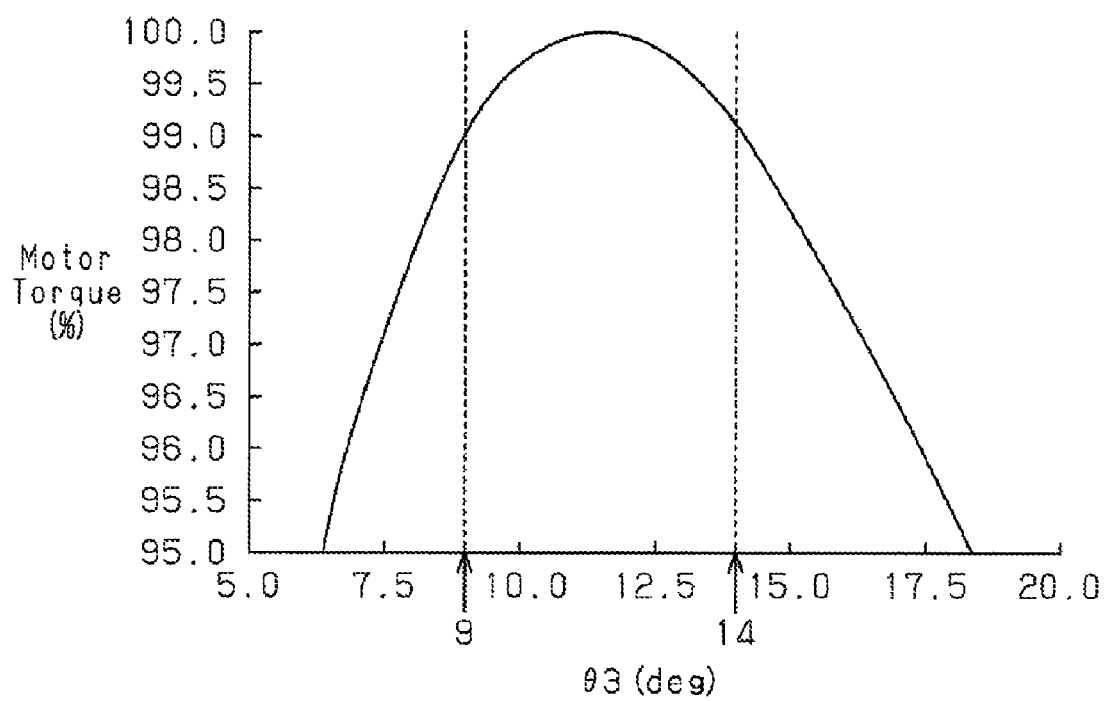
FIG. 29 is a graph showing the relationship between the third angle of nip of the motor according to the third embodiment and the motor torque.
Figure 30:
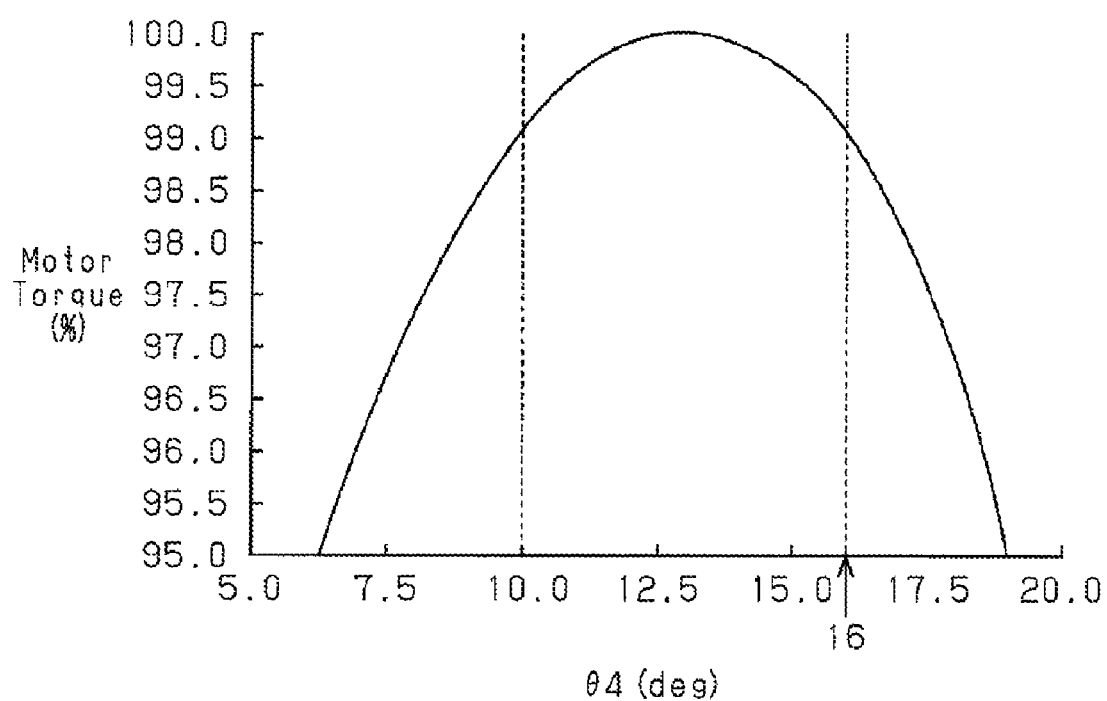
FIG. 30 is a graph showing the relationship between the fourth angle of nip of the motor according to the third embodiment and the motor torque.

FIG. 29 is a graph showing the relationship between the third angle of nip θ3 and the torque of the motor 1C. FIG. 30 is a graph showing the relationship between the fourth angle of nip θ4 and the torque of the motor 1C. Taking into consideration that the brushless motor 1C of the present embodiment has substantially the same structure as the 10-pole 12-slot brushless motor by forming the iron core portions 16 between the adjacent magnetic pole portions 10, the upper limit of the angles of nip θ3, θ4 is assumed to be approximately 18°.

According to FIG. 29, the torque of the motor 1C reaches the maximum value (100%) when the third angle of nip θ3 is approximately 11.5°, and the torque is reduced as the angle deviates from 11.5°. Also, the torque of the motor 1C ensures 99% or more of the maximum value when the third angle of nip θ3 is in the range of approximately 9 to approximately 14° in FIG. 29. Thus, the third angle of nip θ3 is preferably set within the range of approximately 9 to approximately 14°.

Also, according to FIG. 30, the torque of the motor 1C reaches the maximum value (100%) when the fourth angle of nip θ4 is approximately 13°, and the torque is reduced as the angle deviates from 13°. Also, the torque of the motor 1C ensures 99% or more of the maximum value when the fourth angle of nip θ4 is within the range of approximately 10 to approximately 16° in FIG. 30. Thus, the fourth angle of nip θ4 is preferably set within the range of approximately 10 to approximately 16°.

Figure 27:
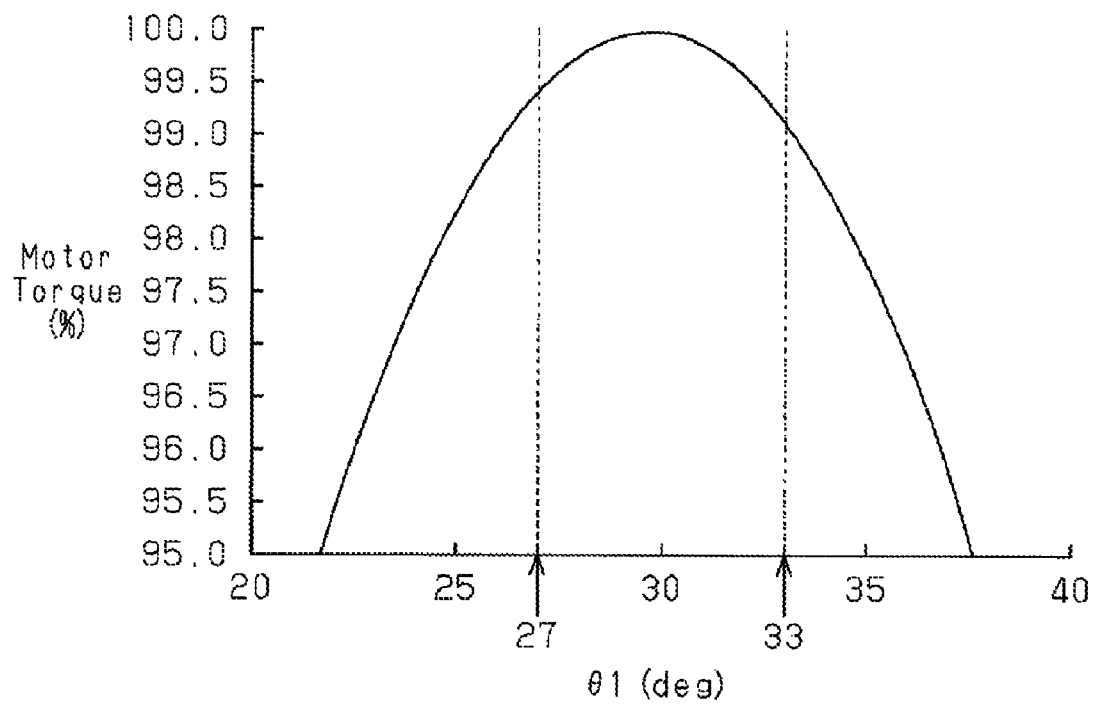
FIG. 27 is a graph showing the relationship between the first angle of nip of the motor according to the third embodiment and the motor torque.
Figure 28:
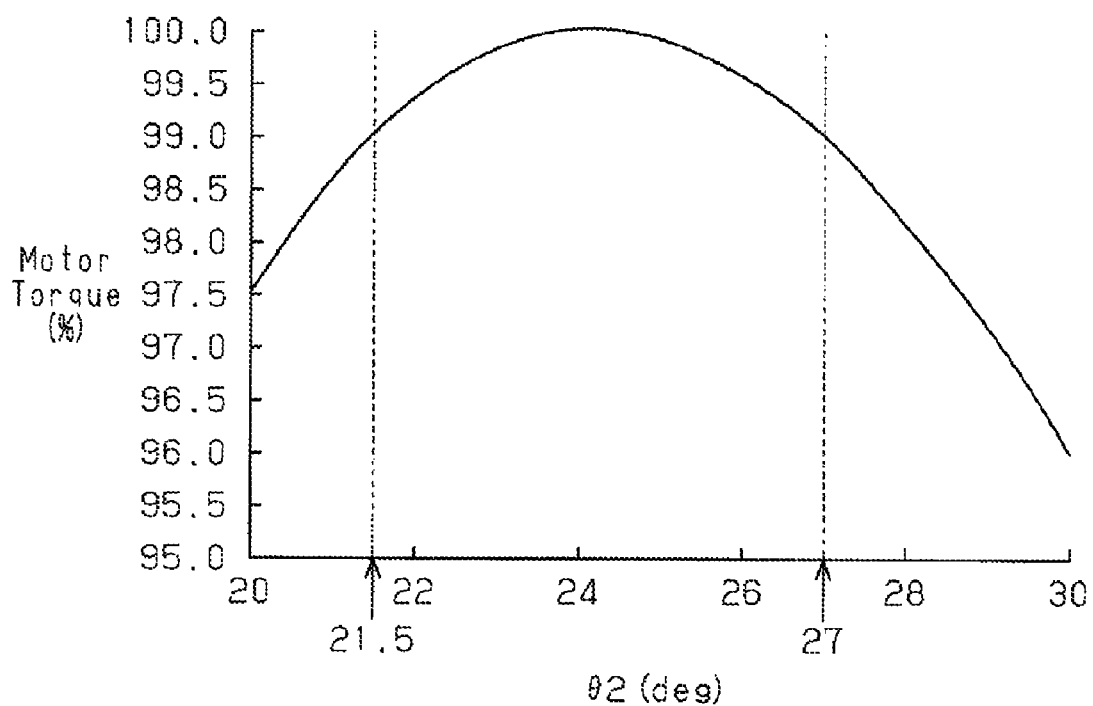
FIG. 28 is a graph showing the relationship between the second angle of nip of the motor according to the third embodiment and the motor torque.

Also, FIG. 27 is a graph showing the relationship between the first angle of nip θ1 and the torque of the motor 1C. FIG. 28 is a graph showing the relationship between the second angle of nip θ2 and the torque of the motor 1C.

According to FIG. 27, the torque of the motor 1C reaches the maximum value (100%) when the first angle of nip θ1 is approximately 30°, and ensures 99% or more of the maximum value when the angle of nip θ1 is within the range of 27° to 33°. Also, the torque of the motor 1C ensures 96% or more of the maximum value when the first angle of nip θ1 is within the range of 22.5° to 36.5°. Thus, the angle of nip θ1 is preferably set within the range of 27° to 33°.

Similarly, according to FIG. 28, the torque of the motor 1C reaches the maximum value (100%) when the second angle of nip θ2 is approximately 24°, and is ensured to be greater than or equal to 99% of the maximum value when the second angle of nip θ2 is within the range of 21.5° to 27°. Thus, the angle of nip θ2 is preferably set within the range of 21.5° to 27°.

Taking into consideration the above, the rotor 6 is designed such that the third angle of nip θ3 is 11.5°, the fourth angle of nip θ4 is 13°, the first angle of nip θ1 is 30°, and the second angle of nip θ2 is 24° in the present embodiment.

As shown in FIG. 25, a straight line RCL that passes through the center O of the rotor 6 and the circumferential center position of the iron core portion 16 is displaced forward in the rotation direction of the rotor 6 from a straight line ICL that passes through the circumferential center position of a circumferential range defined by the straight line L1 and the straight line L2. Thus, the end P2 located on the trailing end of the second gap 14b is set to be located forward of the straight line LA that passes through the circumferential center of the leading one of the teeth 3 facing the iron core portion 16 (the tooth 3a in FIG. 25). Also, the end P1 located on the leading end of the first gap 14a located on the trailing end of the iron core portion 16 is located rearward of a tooth bar end portion T1 of the leading one of the teeth 3 facing the iron core portion 16 (tooth 3a in FIG. 25). The end P3 located on the trailing end of the first gap 14a is set to be located rearward of a straight line LB that passes through the circumferential center position of the trailing one of the teeth 3 facing the iron core portion 16 (tooth 3b in FIG. 25).

That is, when the iron core portion 16 is located to radially face the teeth 3 (3a, 3b), most part of the second gap 14b located on the leading end of the iron core portion 16 (in the present embodiment, the entire second gap 14b) is set to be located forward of the circumferential center position (position on the straight line LA) of the leading tooth 3a among the teeth 3a, 3b. Also, most part of the first gap 14a located on the trailing end of the iron core portion 16 is set to be located forward of the circumferential center position (position on the straight line LB) of the trailing tooth 3b among the teeth 3a, 3b. In FIG. 25, a straight line LC that passes through the substantial center between the ends P2, P4 of the second gap 14b is located forward of the straight line LA. The above description is also apparent from the fact that a straight line LD that passes through the substantial center between the ends P1, P3 of the first gap 14a is located forward of the straight line LB in FIG. 25.

This structure allows the magnetic flux generated from a radially inner part of each permanent magnet 11 to easily and positively flow to the leading tooth 3a via the associated iron core portion 16. Thus, the magnetic attractive force acts on the iron core portion 16 so that iron core portion 16 is easily attracted to the leading tooth 3a, thereby improving the torque of the motor 1C.

The present embodiment has the following advantages.

(9) The rotation direction of the rotor 6 is defined to be one direction, and the numbers of the permanent magnets 11 and the magnetic pole portions 10 are each sec to be an odd number (in the present embodiment, five). Among the gaps 14a, 14b provided in each pole portion 10, the circumferential width W1 of the first gap 14a located in the leading direction of rotation of the rotor 6 is set to be greater than the circumferential width W2 of the second gap 14b located in the trailing direction of rotation of the rotor 6. Furthermore, the iron core portion 16 is structured such that the straight line RCL, which passes through the circumferential center position of the iron core portion 16, is displaced forward in the rotation direction of the rotor 6 from the straight line ICL, which passes through the circumferential center position of the circumferential direction range defined by the straight lines L1, L2, which pass through the circumferential center position of the circumferentially adjacent two magnetic pole portions 10 with the iron core portion 16 located in between. This allows the magnetic flux generated from a radially inner part of each permanent magnet 11 to easily and actively flow to the leading tooth 3a via the associated iron core portion 16. Thus, the magnetic attractive force acts on the iron core portion 16 such that the iron core portion 16 is easily attracted to the leading tooth 3a. This increases the torque of the motor.

(10) The rotor 6 includes five magnetic pole portions 10 and five iron core portions 16. The first angle of nip θ1 defined by the straight line L (L1, L2) that passes through the circumferential center position of the pole portion 10 and the straight line M1 that passes through the end P1 located on the leading end of the first gap 14a is set to be greater than 22.5°. Also, the second angle of nip θ2 defined by the straight line L (L1, L2) and the straight line M2 that passes through the end P2 located on the trailing end of the second gap 14b is set to be less than 30°. With this structure, the positional relationship between the magnetic pole portions 10 and the iron core portions 16 is optimized. This further increases the torque of the motor 1C.

(11) The third angle of nip θ3 defined by the straight line L (L1, L2) that passes through the circumferential center position of the pole portion 10 and the straight line M3 that passes through the center O of the rotor 6 and the end P3 located on the trailing end of the first gap 14a is set to be 9 to 14°. Also, the fourth angle of nip θ4 defined by the straight line L (L1, L2) and the straight line M4 that passes through the rotor center O and the end P4 located on the leading end of the second gap 14b is set to 10 to 16°. In this case, the first angle of nip θ1 is set to 27 to 33°, and the second angle of nip θ2 is set to 21.5 to 27°. With this structure, the positional relationship between the magnetic pole portions 10 and the iron core portions 16 is optimized (see FIGS. 27 to 30). This increases the torque of the motor 1C.

The third embodiment may be modified as follows.

Figure 31:
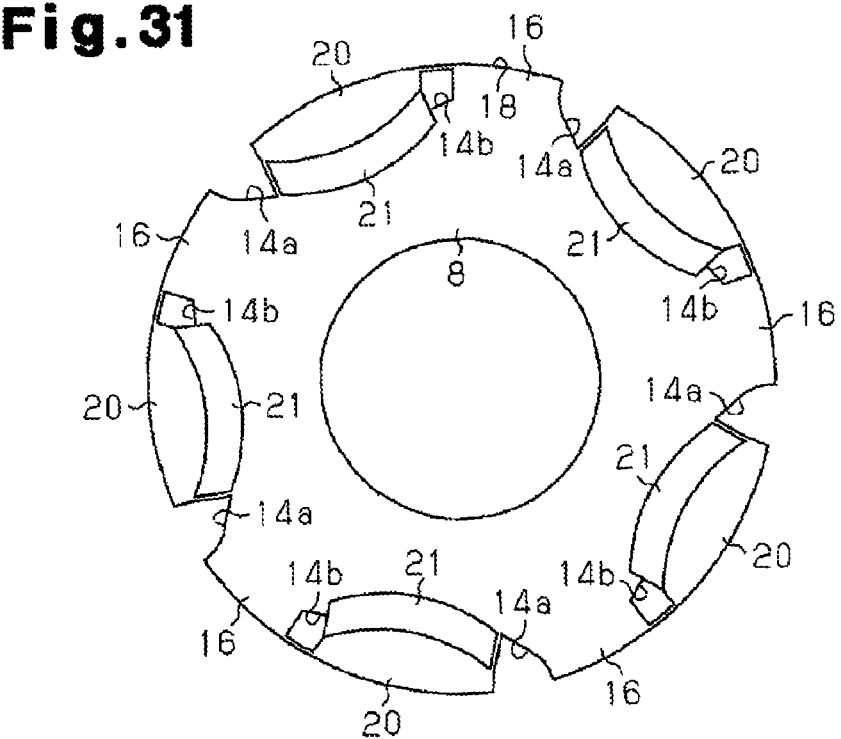
FIG. 31 is a plan view illustrating a rotor core according to a modified embodiment of the third embodiment.
Figure 32:
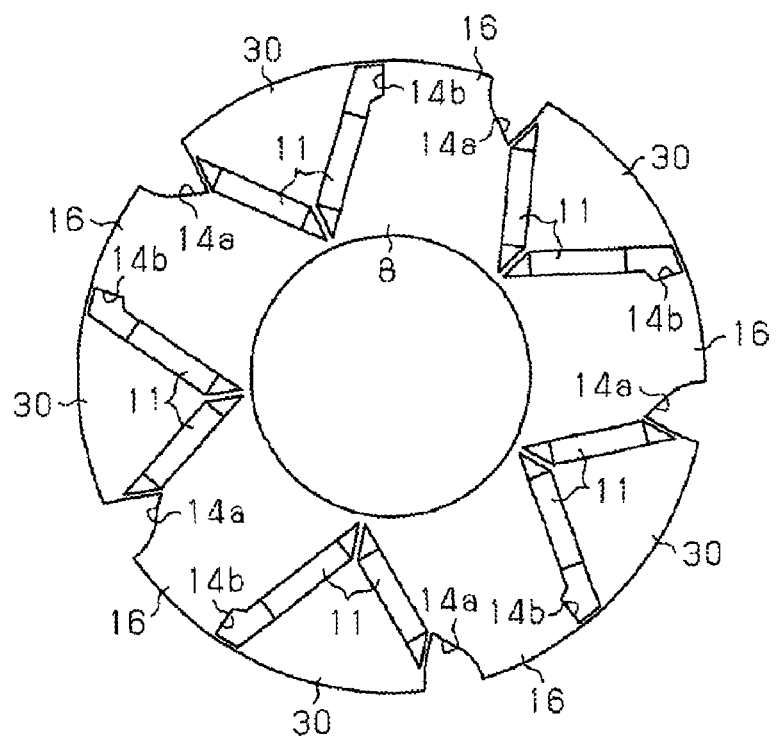
FIG. 32 is a plan view illustrating a rotor core according to a modified embodiment of the third embodiment.

In the third embodiment, the magnetic pole portions 10 are formed by the plate-like (I-shaped cross-section) permanent magnets 11, but not limited to this. For example, the magnetic pole portions 20 may be formed by curved plate-like (arcuate cross-section) permanent magnets 21 as shown in FIG. 31. Also, the plate-like permanent magnets 11 may be arranged in V-shapes to form magnetic pole portions 30 as shown in FIG. 32.

In the third embodiment, the embedded permanent magnet (IPM) rotor 6 is employed in which the permanent magnets 11 are embedded in the magnet accommodating holes 13 of the rotor core 8 to form the magnetic pole portions 10. However, a surface magnet type (SPM) rotor may be employed in which the magnetic pole portions are formed by securing the permanent magnets on the outer circumferential surface of the rotor core.

In the third embodiment, five magnetic pole portions 10 and five iron core portions 16 are provided, that is, ten poles are provided, but not limited to this. The same odd number of the magnetic pole portions 10 and the iron core portions 16 may be provided.

In the third embodiment, twelve teeth 3 are provided, but the number of the teeth may be changed to, for example, twenty-four or forty-eight.

A brushless motor 1D according to a fourth embodiment of the present invention will now be described with reference to FIGS. 33 to 39.

Figure 33:
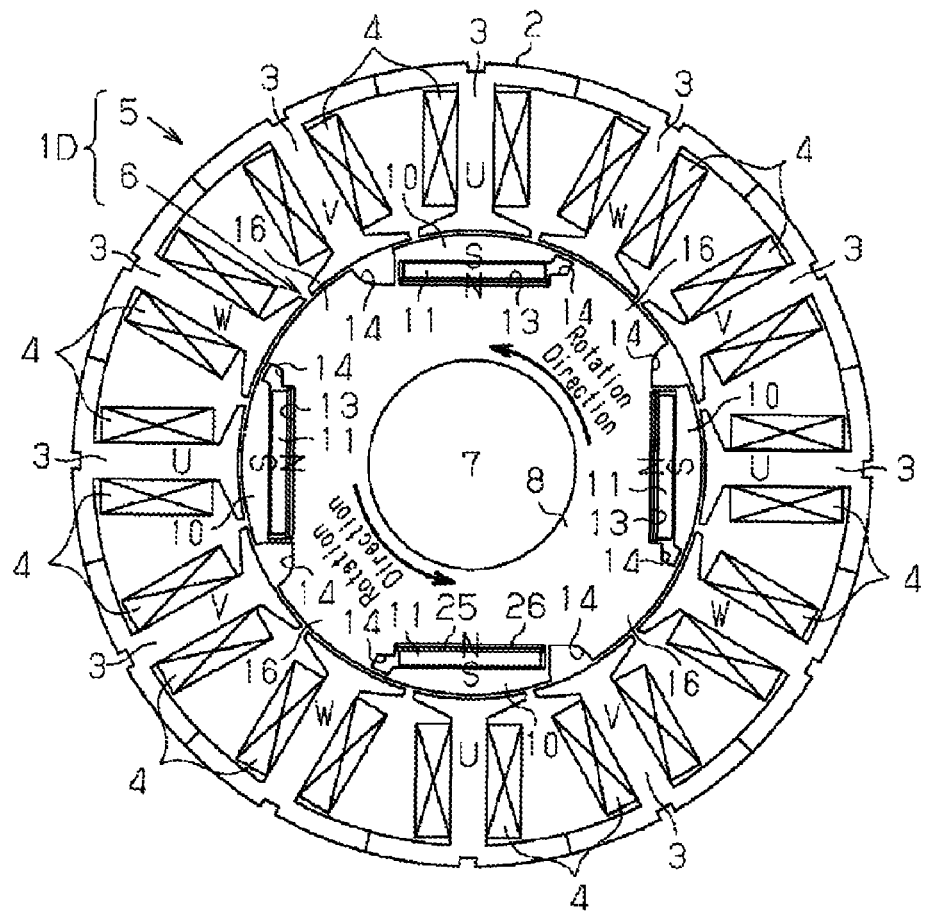
FIG. 33 is a schematic diagram illustrating a brushless motor according to a fourth embodiment of the present invention.
Figure 34:
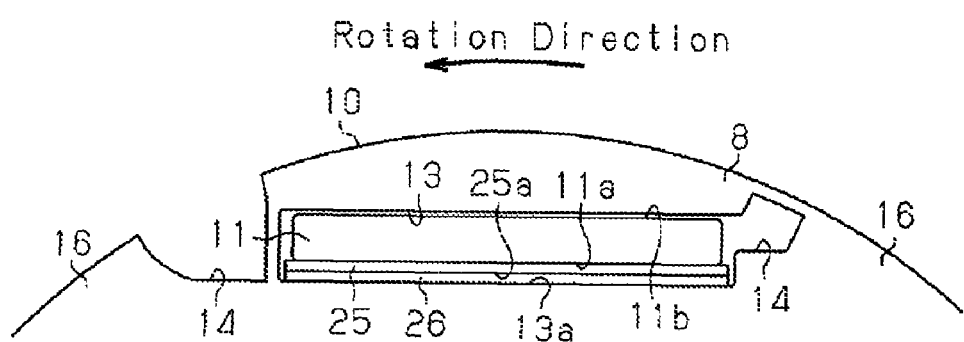
FIG. 34 is a diagram for explaining the arrangement of each permanent magnet embedded in the rotor core of the brushless motor of FIG. 33 and the magnetic members.
Figure 35:
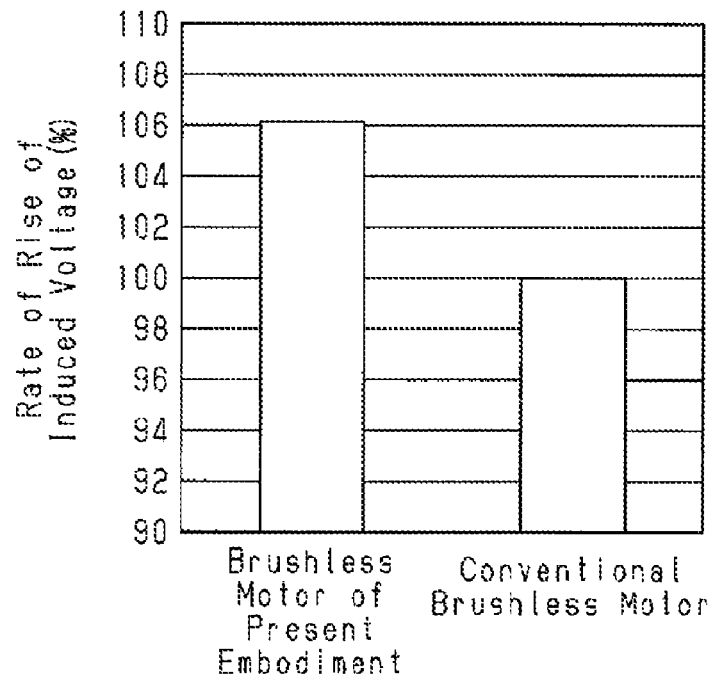
FIG. 35 is a graph showing the comparison of the motor according to the fourth embodiment and the conventional motor.

The stator 5 of the brushless motor 1D of the present embodiment is accommodated in a non-illustrated motor housing, and includes twelve teeth 3 and coils 4 wound around each of the teeth 3 as shown in FIG. 33. The coils 4 are formed by three-phases including the U-phase, the W-phase, and the V-phase, and are arranged in the order of the U-phase, the W-phase, and the V-phase in the clockwise direction by forward winding. Three-phase (U-phase, V-phase, W-phase) alternating current is supplied to the coils 4 wound around the teeth 3.

The permanent magnet 11 and magnetic members (in the present embodiment, two magnetic members), which are a first magnetic steel sheet 25 and a second magnetic steel sheet 26, are accommodated in and secured to each of the magnet accommodating portions, which are the magnet accommodating holes 13.

The first magnetic steel sheet 25 is arranged to be in surface contact with a radially inner magnetic pole surface 11a (north pole surface) of the permanent magnet 11, and the second magnetic steel sheet 26 is arranged to be in surface contact with a radially inward plate surface 25a of the first magnetic steel sheet 25. Also, the magnetic steel sheets 25, 26 are set such that the widthwise length (left and right length in FIG. 34) is longer than the widthwise length of the permanent magnet 11, and is shorter than the widthwise length of the magnet accommodating hole 13. Thus, the magnetic steel sheets 25, 26 easily cover the permanent magnet 11.

In the brushless motor 1D configured as described above, the rotary shaft 7 is rotated with the rotor 6 by supplying a three-phase alternating current to the coil 4. The permanent magnet 11 and the magnetic steel sheets 25, 26 are inserted in each of the magnet accommodating holes 13. Thus, a gap between the radially inner magnetic pole surface 11a of the permanent magnet 11 and an inner surface 13a of the magnet accommodating hole 13 is reduced by the magnetic steel sheets 25, 26. This permits the magnetic flux generated from the radially inner magnetic pole surface 11a to pass toward the iron core portion 16 in a suitable manner.

The present inventors performed a simulation to show the effectiveness of the present embodiment. The simulation was performed under conditions that two magnetic steel sheets 25, 26 having a thickness of approximately 0.1 mm (total thickness is approximately 0.2 mm) were arranged in each gap when the thickness of the permanent magnet 11 was 2.25 mm and the gap in the radial direction between each permanent magnet 11 and the associated magnet accommodating hole 13 was 0.335 mm. When the induced voltage of the conventional brushless motor having a gap of 0.335 mm was assumed to be 100%, the induced voltage was increased to approximately 106.1% (see FIG. 35) in the brushless motor of the present embodiment. That is, since permeance was increased by inserting the magnetic steel sheets 25, 26 into the magnet accommodating holes 13, the effective magnetic flux was increased, thus increasing the induced voltage. Therefore, arranging the magnetic steel sheets 25, 26 between each permanent magnet 11 and the associated magnet accommodating hole 13 as in the present embodiment increases the effective magnetic flux, and improves the output performance of the motor 1D.

Also, for example, a gap in the radial direction between a radially outer magnetic pole surface 11b of each permanent magnet 11 and the associated magnet accommodating hole 13 can be slightly left by arranging the first magnetic steel sheet 25 to abut against the radially inner magnetic pole surface 11a of the permanent magnet 11. This reduces an eddy current that might be generated radially outward of the permanent magnet 11, and prevents deterioration of the output performance caused by eddy-current loss. Also, the magnetic steel sheets 25, 26 used as the magnetic members to fill the gap in the radial direction between each permanent magnet 11 and the associated magnet accommodating hole 13 are formed of iron having high magnetic permeability among ferromagnetic elements, and are members having less core loss, which is the sum of hysteresis loss and eddy-current loss. This contributes to the improvement of the output performance of the motor 1D.

The present embodiment has the following advantages.

(12) The magnetic members, which are the magnetic steel sheets 25, 26, are arranged in the magnet accommodating portions, which are the magnet accommodating holes 13, to fill the gap in the radial direction between the magnetic pole surface 11a of each permanent magnet 11 and the associated magnet accommodating hole 13. Thus, the gap in the radial direction between each magnet accommodating hole 13 and the associated permanent magnet 11 is easily reduced by the magnetic steel sheets 25, 26. Since the magnetic steel sheets 25, 26 are magnetic members, the magnetic steel sheets 25, 26 permit the magnetic flux of the associated permanent magnet 11 to pass therethrough in a suitable manner. This increases the amount of magnetic flux that flows through the iron core portion 16 and improves the output performance of the motor 1D. Also, a backlash caused in the radial direction of each permanent magnet 11 is reduced since the gap is reduced by the magnetic steel sheets 25, 26.

(13) The rotor 6 is arranged radially inward of the stator 5. The magnetic steel sheet 25 is arranged to abut against the radially inner magnetic pole surface 11*a* of the permanent magnet 11. With this structure, for example, the gap in the radial direction between the radially outer magnetic pole surface 11*a* of the permanent magnet 11 and the magnet accommodating hole 13 can be slightly left while keeping the magnetic flux passage to the iron core portion 16 to be satisfactory. This prevents generation of an eddy current that might occur on a radially outer part and deterioration of the output performance of the motor 1D by the eddy-current loss.

(14) The surfaces of the magnetic steel sheets 25, 26 facing the permanent magnet 11 are greater than the magnetic pole surface 11*a* of the permanent magnet 11. Thus, when the permanent magnet 11 and the magnetic steel sheets 25, 26 are accommodated in each magnet accommodating hole 13, the magnetic pole surface 11*a* of the permanent magnet 11 is more reliably covered by the magnetic steel sheets 25, 26. Thus, the magnetic flux generated from the permanent magnet 11 is permitted to pass toward the iron core portion 16 in a suitable manner. This further improves the output performance of the motor 1D.

(15) The first and second magnetic steel sheets 25, 26 are members having high magnetic permeability among the ferromagnetic elements, and having less core loss, which is the sum of the hysteresis loss and the eddy-current loss. The first and second magnetic steel sheets 25, 26 thus contribute to the improvement of the output performance as the motor 1D.

The fourth embodiment may be modified as follows.

In the fourth embodiment, two magnetic steel sheets 25, 26 are provided as the magnetic members, but one or three or more magnetic members may be provided as long as the magnetic steel sheets fill the gap in the radial direction between each permanent magnet 11 and the associated magnet accommodating hole 13.

In the fourth embodiment, the radially inner magnetic pole surface (north pole magnetic pole surface) 11*a* of the permanent magnet 11 abuts against the magnetic member, which is the first magnetic steel sheet 25. Instead, the radially outer magnetic pole surface (south pole magnetic pole surface) 11*b* may abut against the magnetic member. Also, each permanent magnet 11 may be sandwiched by several magnetic members.

Although it is not particularly mentioned in the fourth embodiment, the gap between each magnetic pole surface 11*a* and the associated magnet accommodating hole 13 is more reliably filled by press-fitting the magnetic steel sheets 25, 26 into the magnet accommodating hole 13.

Figure 36A:
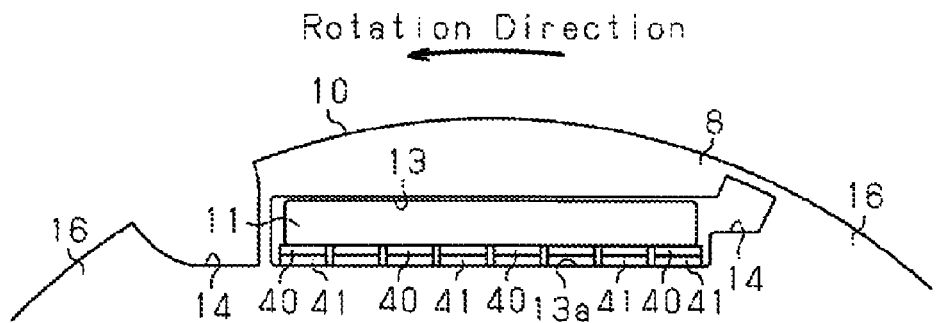
FIGS. 36A and 36B are diagrams for explaining the arrangement of each permanent magnet and the magnetic members according to a modified embodiment of the third embodiment.
Figure 36B:
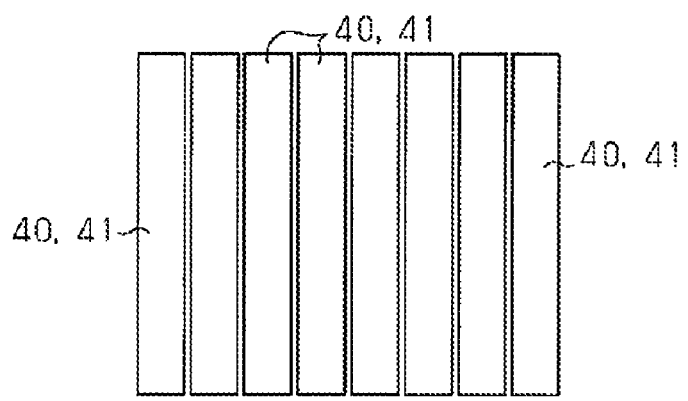
Figure 37A:
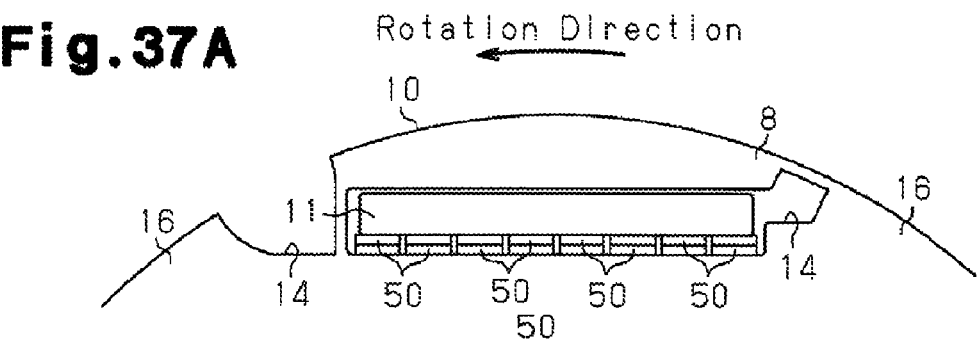
FIGS. 37A and 37B are diagrams for explaining the arrangement of each permanent magnet and the magnetic members according to a modified embodiment of the third embodiment.
Figure 37B:
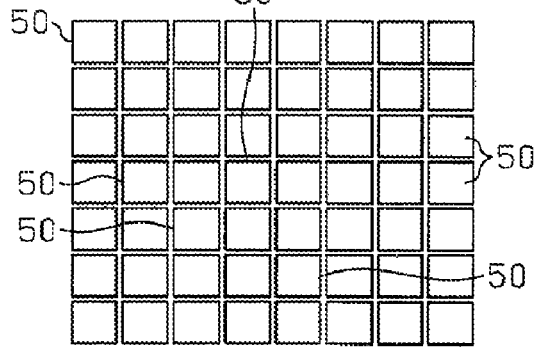

In the fourth embodiment, the magnetic members, which are the magnetic steel sheets 25, 26, are formed by plate-like members, but the magnetic members (magnetic steel sheets 25, 26) may be formed by a combination of several members. For example, strip-like magnetic members 40, 41 divided in the widthwise direction of the permanent magnet 11 (left and right direction in the drawing) may be employed as shown in FIGS. 36A, 36B. Furthermore, block-like magnetic members 50 divided in the widthwise and axial direction of the permanent magnet 11 (perpendicular to the sheet of the drawing) may be employed as shown in FIGS. 37A, 37B. As described above, forming the magnetic members with several members reduces an eddy current, thus reducing the eddy-current loss.

Although not particularly mentioned in the fourth embodiment, slits may be formed in the magnetic members, which are the magnetic steel sheets 25, 26. With this structure, an eddy current is reduced, thus reducing the eddy-current loss.

Figure 38:
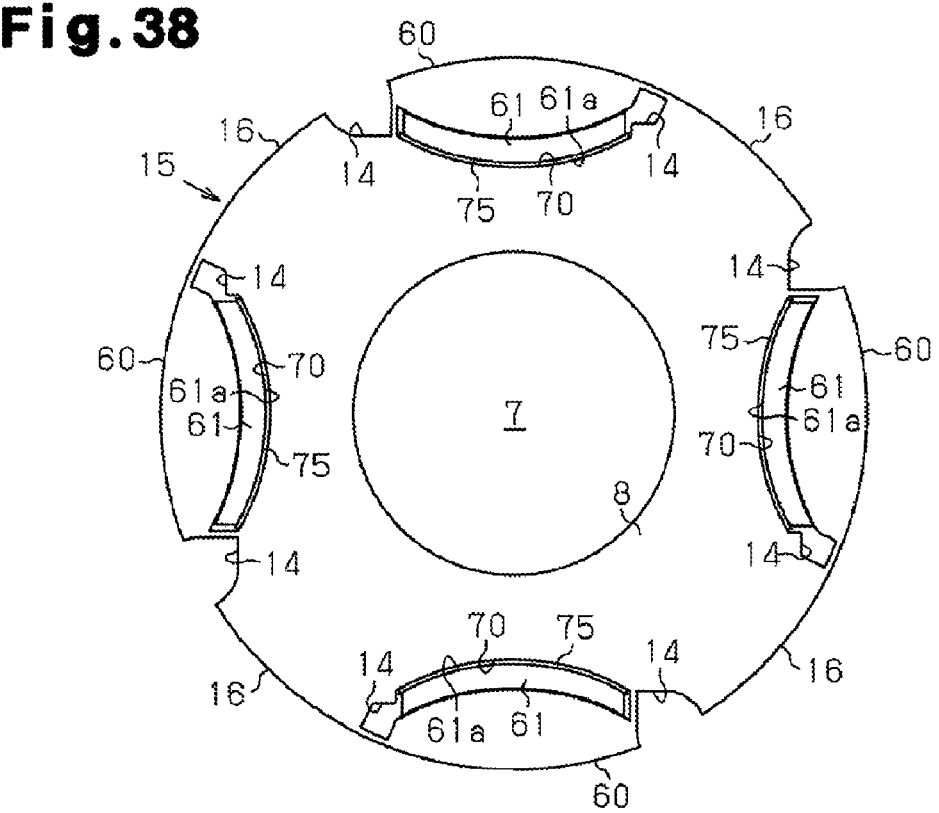
FIG. 38 is a schematic diagram illustrating a rotor according to a modified embodiment of the fourth embodiment.
Figure 39:
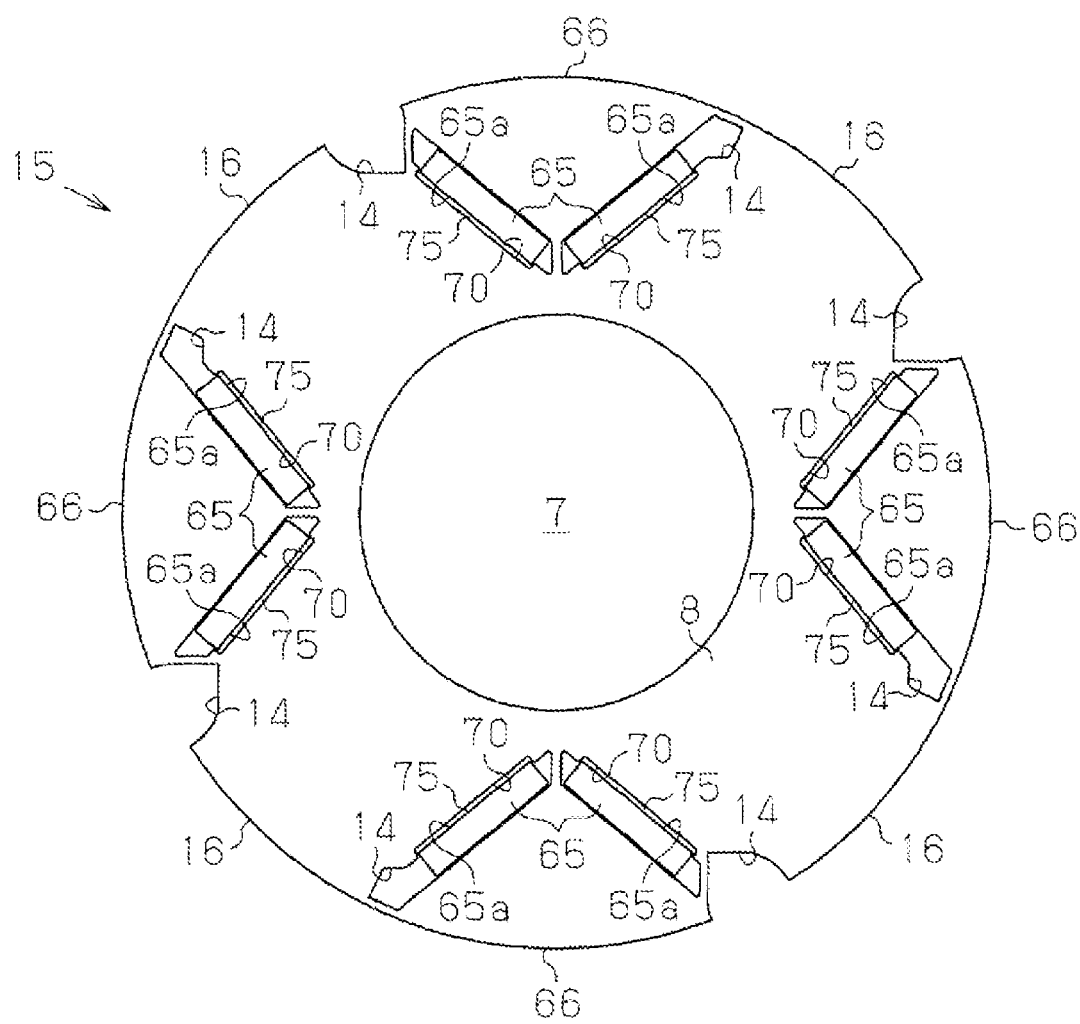
FIG. 39 is a schematic diagram of a rotor according to a modified embodiment of the fourth embodiment.

In the fourth embodiment, the magnetic pole portions 10 are formed by plate-like permanent magnets 11, but not limited to this. For example, magnetic pole portions 60 may be formed by curved plate-like permanent magnets 61 as shown in FIG. 38. Alternatively, magnetic pole portions 66 may be formed by plate-like permanent magnets 65 arranged in V-shapes as shown in FIG. 39. With this structure, the same advantages as the above embodiments are obtained by arranging magnetic members 75, which are in surface contact with the permanent magnets 61, 65 and magnetic pole surfaces 61*a*, 65*a*, in the gap between magnet accommodating holes 70 and the permanent magnets 61, 65. When the curved permanent magnets 61 are used as shown in FIG. 38, magnetic members that are formed following the curved shape are preferably arranged.

In the fourth embodiment, the coils 4 are arranged in the order of the U-phase, the W-phase, and the V-phase in the clockwise direction by forward winding in the 8-pole 12-slot motor 10, but not limited to this. For example, in the 10-pole 12-slot motor, the coils may be arranged such that forward winding and reverse winding are located side by side per each phase, and three phases are arranged in the order of the W-phase (forward winding), $\overline{W}$-phase (reverse winding), $\overline{V}$-phase, V-phase, U-phase, $\overline{U}$-phase, $\overline{W}$-phase, W-phase, V-phase, $\overline{V}$-phase, $\overline{U}$-phase, and U-phase in the clockwise direction. In this case also, induced voltage is increased by applying the present invention, and the output performance of the motor 1D is improved.

In the fourth embodiment, the magnetic members are formed by the magnetic steel sheets 25, 26, but not limited to this. For example, the magnetic members may be formed by a ferromagnetic damping alloy. Vibration that might be generated in accordance with the rotation of the rotor 6 is reduced by forming the magnetic members with the ferromagnetic damping alloy.

In the fourth embodiment, the gaps 14*a*, 14*b* between the magnetic pole portions 10 and the iron core portions 16 are formed into an asymmetric shape, but may also be formed into a symmetric shape.

In the fourth embodiment, the motor is formed as the inner rotor brushless motor in which the rotor 6 is rotatably arranged inside the stator 14, but the motor may be an outer rotor brushless motor.

A brushless motor 1E according to a fifth embodiment of the present invention will now be described with reference to FIGS. 40 to 41B.

Figure 40:
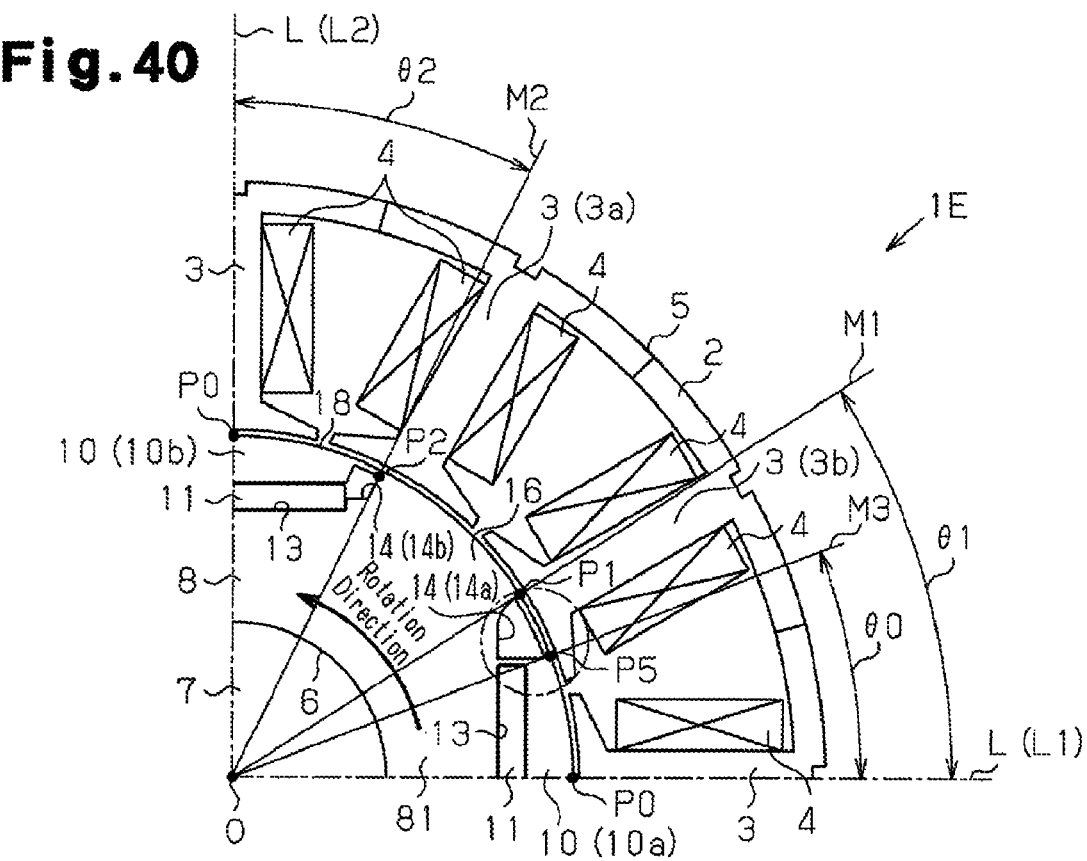
FIG. 40 is a schematic diagram illustrating a brushless motor according to a fifth embodiment of the present invention.
Figures 41A, 41B:
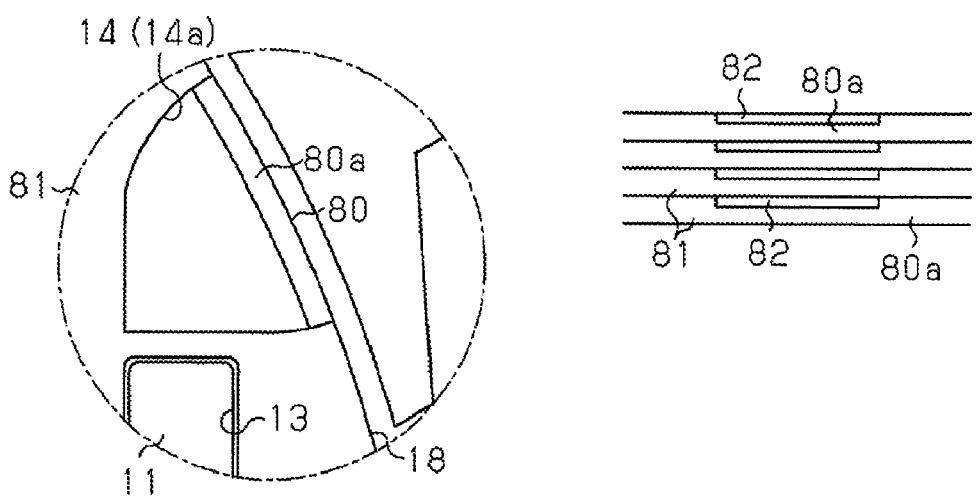
FIG. 41A is an enlarged partial view illustrating the brushless motor of FIG. 40.
FIG. 41B is a partial side view illustrating the brushless motor of FIG. 40.

As shown in FIG. 40, in the present embodiment, each of the first gaps 14*a* is partially closed by a bridge portion (cover portion) 80 at the circumferential surface 18 of the rotor 6 (rotor core 8). More specifically, the rotor core B is formed by laminating disk-like core seats 81 along the axial direction of the rotor core 8. Holes are formed in each of the core seats 81 so that the magnet accommodating holes 13 and the first and second gaps 14*a*, 14*b* are formed when the core seats 81 are laminated. As shown in FIGS. 41A, 41B, the peripheral portion of each core seat 81 corresponding to the first gap 14*a* forms a bridge piece 80*a*, which is thinner than other part of the core seat 81. In the state where the core seats 81 are laminated, bridge pieces 80*a* are arranged to form slits (communication holes) 82 between adjacent bridge pieces 80*a*. The bridge pieces 80*a* arranged as described above form the bridge portions (cover portions) 80, which partially close the first gaps 14*a*. The bridge pieces 80*a* are formed by, for example, pressing such that parts of the core seats 81 become thin. When viewed from the radial direction of the rotor core 8 as shown in FIG. 41B, the bridge pieces 80*a* and the slits 82 are alternately arranged along the axial direction of the rotor core 8 at the peripheral portion of the rotor core 8 corresponding to the first gaps 14*a*.

The present embodiment has the following advantages.

(16) The first gaps 14*a* are partially closed by the bridge portions 80 at the circumferential surface 18 of the rotor 6 (rotor core 8). Thus, as compared to the case where the first gaps 14*a* are completely open to the circumferential surface 18 of the rotor 6, the strength of the rotor 6 is increased while reducing the windage loss during rotation of the rotor 6, and moreover, the cogging torque is reduced. In addition, as compared to the case where the first gaps 14*a* are completely closed, the magnetic resistance of the first gaps 14*a* is further increased, which increases the output of the brushless motor 1E.

The first to fifth embodiments may be modified as follows.

The permanent magnets 11 are arranged such that the radially outer surfaces are south poles. However, the magnetic pole portions may be arranged such that the radially outer surfaces are north poles.

The second gaps 14*b* are formed not to open to the outer circumferential surface 18 of the rotor 6 (rotor core 8), but the second gaps 14*b* may be open to the outer circumferential surface 18.

At least two of the above-mentioned embodiments may be combined.

What is claimed is:

1. A brushless motor comprising a stator including a plurality of teeth around which coils are wound, and a rotor, which is rotatable with respect to the teeth and includes a plurality of magnetic pole portions that face the teeth,
wherein the rotor includes a plurality of magnet accommodating portions arranged at equal angular intervals along the circumferential direction of the rotor, permanent magnets forming the magnetic pole portions are accommodated in the magnet accommodating portions, and the permanent magnets face the teeth and have magnetic pole surfaces of the same polarities,
wherein the rotor includes gaps that function as magnetic resistance at circumferential ends of each of the magnetic pole portions so that an iron core portion is formed between circumferentially adjacent magnetic pole portions, and magnetic flux of the magnetic pole portions passes through the iron core portion along the radial direction,
wherein a magnetic member is arranged in each magnet accommodating portion to fill the gap between the magnetic pole surface of the associated permanent magnet and the inner surface of the magnet accommodating portion facing the magnetic pole surface,
wherein the rotor is rotatably arranged radially inward of the stator, and
wherein each magnetic member is arranged in the associated magnet accommodating portion to abut against only the radially inner magnetic pole surface of the corresponding permanent magnet.

2. The motor according to claim 1, wherein each magnetic member is a magnetic steel sheet.

3. The motor according to claim 1, wherein each magnetic member is a ferromagnetic damping alloy.

4. The motor according to claim 1,
wherein the gaps provided on the circumferential ends of each of the magnetic pole portions include a first gap located on the leading end of the magnetic pole portion in the rotation direction of the rotor and a second gap located on the trailing end of the magnetic pole portion in the rotation direction of the rotor, and the rotor includes slits at part of the outer circumferential surface corresponding to the first gaps so that the first gaps are partially open on the outer circumferential surface of the rotor.

5. A brushless motor comprising a stator including a plurality of teeth around which coils are wound, and a rotor, which is rotatable with respect to the teeth and includes a plurality of magnetic pole portions that face the teeth,
wherein the rotor includes a plurality of magnet accommodating portions arranged at equal angular intervals along the circumferential direction of the rotor, permanent magnets forming the magnetic pole portions are accommodated in the magnet accommodating portions, and the permanent magnets face the teeth and have magnetic pole surfaces of the same polarities,
wherein the rotor includes gaps that function as magnetic resistance at circumferential ends of each of the magnetic pole portions so that an iron core portion is formed between circumferentially adjacent magnetic pole portions, and magnetic flux of the magnetic pole portions passes through the iron core portion along the radial direction,
wherein a magnetic member is arranged in each magnet accommodating portion to fill the gap between the magnetic pole surface of the associated permanent magnet and the inner surface of the magnet accommodating portion facing the magnetic pole surface, and
wherein each magnetic member is formed by a member having a slit or by a plurality of members to reduce an eddy current.

6. The motor according to claim 5, wherein each magnetic member is a magnetic steel sheet.

7. The motor according to claim 5, wherein each magnetic member is a ferromagnetic damping alloy.

8. The motor according to claim 5,
wherein the gaps provided on the circumferential ends of each of the magnetic pole portions include a first gap located on the leading end of the magnetic pole portion in the rotation direction of the rotor and a second gap located on the trailing end of the magnetic pole portion in the rotation direction of the rotor, and the rotor includes slits at part of the outer circumferential surface corresponding to the first gaps so that the first gaps are partially open on the outer circumferential surface of the rotor.

9. A brushless motor comprising a stator including a plurality of teeth around which coils are wound, and a rotor, which is rotatable with respect to the teeth and includes a plurality of magnetic pole portions that face the teeth,
wherein the rotor includes a plurality of magnet accommodating portions arranged at equal angular intervals along the circumferential direction of the rotor, permanent magnets forming the magnetic pole portions are accommodated in the magnet accommodating portions, and the permanent magnets face the teeth and have magnetic pole surfaces of the same polarities,
wherein the rotor includes gaps that function as magnetic resistance at circumferential ends of each of the magnetic pole portions so that an iron core portion is formed between circumferentially adjacent magnetic pole portions, and magnetic flux of the magnetic pole portions passes through the iron core portion along the radial direction, wherein a magnetic member is arranged in each magnet accommodating portion to fill the gap between the magnetic pole surface of the associated permanent magnet and the inner surface of the magnet accommodating portion facing the magnetic pole surface, and wherein the surface of each magnetic member facing the associated permanent magnet is greater than the magnetic pole surface of the permanent magnet.

10. The motor according to claim 9, wherein each magnetic member is a magnetic steel sheet.

11. The motor according to claim 9, wherein each magnetic member is a ferromagnetic damping alloy.

12. The motor according to claim 9,
wherein the gaps provided on the circumferential ends of each of the magnetic pole portions include a first gap located on the leading end of the magnetic pole portion in the rotation direction of the rotor and a second gap located on the trailing end of the magnetic pole portion in the rotation direction of the rotor, and the rotor includes slits at part of the outer circumferential surface corresponding to the first gaps so that the first gaps are partially open on the outer circumferential surface of the rotor.

* * * * *